United States Patent
Bordes et al.

(10) Patent No.: US 10,986,366 B2
(45) Date of Patent: Apr. 20, 2021

(54) VIDEO CODING WITH ADAPTIVE MOTION INFORMATION REFINEMENT

(71) Applicant: InterDigital VC Holdings, Inc., Wilmington, DE (US)

(72) Inventors: Philippe Bordes, Laille (FR); Fabien Racape, Rennes (FR); Tangi Poirier, Thorigné-Fouillard (FR); Franck Galpin, Thorigne-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/312,213

(22) PCT Filed: Jun. 27, 2017

(86) PCT No.: PCT/EP2017/065803
§ 371 (c)(1),
(2) Date: Dec. 20, 2018

(87) PCT Pub. No.: WO2018/002021
PCT Pub. Date: Jan. 4, 2018

(65) Prior Publication Data
US 2019/0261018 A1    Aug. 22, 2019

(30) Foreign Application Priority Data
Jun. 30, 2016   (EP) .................................... 16305826

(51) Int. Cl.
*H04N 19/53* (2014.01)
*H04N 19/139* (2014.01)
(Continued)

(52) U.S. Cl.
CPC ........... *H04N 19/53* (2014.11); *H04N 19/139* (2014.11); *H04N 19/14* (2014.11); *H04N 19/176* (2014.11);
(Continued)

(58) Field of Classification Search
CPC .. H04N 19/523; H04N 19/176; H04N 19/139; H04N 19/61; H04N 19/52;
(Continued)

(56) References Cited

U.S. PATENT DOCUMENTS 5,876,126 A    3/1999   Marshall et al.
7,526,028 B2 *  4/2009   Sung ...................... H04N 19/56
                                                        348/699
(Continued)

FOREIGN PATENT DOCUMENTS

RU          2408160 C1     12/2010
WO       WO2011047994        4/2011
(Continued)

OTHER PUBLICATIONS

Juncheng et al. "Progressive motion vector resolution for HEVC" IEEE Jan. 9, 2014, 6 Pages. (Year: 2014).*
(Continued)

*Primary Examiner* — Nathnael Aynalem
(74) *Attorney, Agent, or Firm* — Xiaoan Lu

(57) ABSTRACT

In a particular implementation, a video decoder may decode an initial motion vector predictor from the bitstream for a current block, and perform motion search in a small search window to refine the initial motion vector predictor. The initial motion vector may be rounded before being refined. The motion refinement can be based on a discontinuity measure between pixels of a current block and pixels of adjacent block, and can also be based on gradients between the current block and adjacent blocks. The motion vector for the current block is then decoded based on the refined motion vector predictor, and the motion vector difference if there is any. The motion refinement can also be performed on the motion vector for the current block directly. Through motion refinement, the decoder may increase the motion
(Continued)

resolution. A corresponding video encoder may choose whether to use motion refinement based on encoder decisions.

20 Claims, 12 Drawing Sheets

(51) Int. Cl.
| | |
|---|---|
| H04N 19/176 | (2014.01) |
| H04N 19/31 | (2014.01) |
| H04N 19/52 | (2014.01) |
| H04N 19/513 | (2014.01) |
| H04N 19/44 | (2014.01) |
| H04N 19/14 | (2014.01) |
| H04N 19/46 | (2014.01) |

(52) U.S. Cl.
CPC ............ *H04N 19/31* (2014.11); *H04N 19/44* (2014.11); *H04N 19/513* (2014.11); *H04N 19/52* (2014.11); *H04N 19/521* (2014.11); *H04N 19/46* (2014.11)

(58) Field of Classification Search
CPC .... H04N 19/513; H04N 19/82; H04N 19/117; H04N 19/53; H04N 19/105; H04N 19/103; H04N 19/14; H04N 19/157; H04N 19/182; H04N 19/467; H04N 19/48; H04N 19/533; H04N 19/573; H04N 19/109; H04N 19/129; H04N 19/13; H04N 19/136; H04N 19/159; H04N 19/18; H04N 19/196; H04N 19/31; H04N 19/44; H04N 19/46; H04N 19/521; H04N 19/56; H04N 19/57; H04N 19/577; H04N 19/593; H04N 19/91
USPC ........................................ 375/240.01–240.29
See application file for complete search history.

(56) References Cited

U.S. PATENT DOCUMENTS

| | | | |
|---|---|---|---|
| 8,265,136 | B2 | 9/2012 | Hong et al. |
| 8,265,151 | B1* | 9/2012 | Wang .................... H04N 19/523 |
| | | | 375/240 |
| 8,355,440 | B2 | 1/2013 | Qui et al. |
| 8,520,731 | B2 | 8/2013 | Schoenblum |
| 8,736,767 | B2 | 5/2014 | van Beek |
| 8,891,633 | B2 | 11/2014 | Zheludkov et al. |
| 9,154,806 | B2 | 10/2015 | Kim et al. |
| 2005/0018772 | A1 | 1/2005 | Sung et al. |
| 2007/0268968 | A1* | 11/2007 | Sakazume ............. H04N 19/176 |
| | | | 375/240.16 |
| 2008/0253459 | A1* | 10/2008 | Ugur ...................... H04N 19/61 |
| | | | 375/240.17 |
| 2010/0296580 | A1 | 11/2010 | Metoevi et al. |
| 2011/0176611 | A1 | 7/2011 | Haung et al. |
| 2013/0003849 | A1 | 1/2013 | Chien et al. |
| 2013/0034154 | A1* | 2/2013 | Song .................... H04N 19/176 |
| | | | 375/240.03 |
| 2013/0101040 | A1 | 4/2013 | Francois et al. |
| 2013/0121401 | A1 | 5/2013 | Zheludkov et al. |
| 2014/0023144 | A1 | 1/2014 | Park et al. |
| 2015/0117543 | A1 | 4/2015 | Hong et al. |
| 2015/0271524 | A1 | 9/2015 | Zhang et al. |
| 2015/0281708 | A1* | 10/2015 | Chuang ................ H04N 19/577 |
| | | | 375/240.02 |
| 2016/0337649 | A1* | 11/2016 | Chuang ................ H04N 19/105 |
| 2018/0131960 | A1* | 5/2018 | Wang ...................... H04N 19/56 |
| 2018/0270485 | A1 | 9/2018 | Jang et al. |
| 2018/0324437 | A1* | 11/2018 | Kim ...................... H04N 19/139 |

FOREIGN PATENT DOCUMENTS

| | | |
|---|---|---|
| WO | WO2015106126 | 7/2015 |
| WO | WO2016050219 | 4/2016 |

OTHER PUBLICATIONS

Lakshman H et al, Conditional motion vector refinement for improved prediction,2012 Picture Coding Symposium (PCS 2012) ; Proceedings, IEEE,May 7, 2012,pp. 497-500.
Jianle Chen et al, Algorithm description of joint exploration test model 1,1 JVET Meeting, Geneva,Feb. 24, 2016.
Chun K et al, An improved block matching algorithm based on successive refinement of motion vector candidates, Signal Processing. Image Communication, Elsevier Science Publishers, Amsterdam,vol. 6, n°2,May 1, 1994,pp. 115-122.
W-J Chien, Description of core experiment 12 : Adaptive motion vector resolution,94 MPEG Meeting, Guangzhou,n° M18605,Oct. 30, 2010.
Sven Klomp et al: "Evaluation of decoder-side motion estimation within HM 2.0",20110310,No. JCTVC-E055, Mar. 10, 2011.
Steffen Kamp et al: "Decoder-Side MotionVector Derivation for Block-Based Video Coding",IEEE Transactions on Circuits and Systemsfor Video Technology, Institute ofElectrical and Electronics Engineers, USA,vol. 22, No. 12,Dec. 1, 2012 (Dec. 1, 2012), pp. 1732-1745.
Cho et al.,"Adaptive Motion Vector Resolution based on the rate-distrortion cost and coding unit depth", 2014 IEEE Int'l Advance Computing Conference.
International Search Report dated Aug. 22, 2017, in PCT/EP2017/065809 filed Jun. 27, 2017.
International Search Report dated Sep. 7, 2017, in PCT/EP2017/065803 filed Jun. 27, 2017.

* cited by examiner

VIDEO CODING WITH ADAPTIVE MOTION INFORMATION REFINEMENT

This application claims the benefit, under 35 U.S.C. § 371 of International Application No. PCT/EP17/065803, filed Jun. 27, 2017, which was published on Jan. 4, 2018, which claims the benefit of European Patent Application No. EP16305826.6 filed Jun. 30, 2016.

TECHNICAL FIELD

The present principles generally relate to a method and an apparatus for video encoding and decoding, and more particularly, to a method and an apparatus for video encoding and decoding with motion information refinement.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data is decoded by inverse processes corresponding to the prediction, transform, quantization, and entropy coding.

SUMMARY

According to a general aspect, a method for video decoding is presented, comprising: accessing an initial motion vector for a current block in a video, the initial motion vector being based on at least one of a motion vector predictor and a motion vector difference, the initial motion vector being associated with a first motion resolution; searching one or more positions around a position indicated by the initial motion vector in a reference picture, the one or more positions being associated with a second motion resolution, and the second motion resolution being higher than the first motion resolution; determining a refined motion vector for the current block based on the searching; and decoding the current block based on the refined motion vector.

When searching around the initial motion vector, one of (1) discontinuity between a prediction for the current block and a decoded block adjacent to the current block; and (2) gradients at one of the prediction block and the decoded block can be used to determine the refined motion vector for the current block. The one or more searching positions may be determined based on the first resolution and the second resolution.

If the motion vector predictor is at a second resolution, the motion vector predictor can be converted to a resolution lower than the first resolution, for example, by rounding the motion vector predictor. The motion vector predictor can be based on an average of at least two motion vectors of decoded blocks adjacent to the current block.

According to another general aspect, a method for video encoding is presented, comprising: accessing an initial motion vector for a current block in a video, the initial motion vector being based on at least one of a motion vector predictor and a motion vector difference, the initial motion vector being associated with a first motion resolution; searching one or more positions around a position indicated by the initial motion vector in a reference picture, the one or more positions being associated with a second motion resolution, and the second motion resolution being higher than the first motion resolution; determining a refined motion vector for the current block based on the searching; and encoding the current block based on the refined motion vector.

To decide the refined motion vector, a plurality of motion vector predictors can be accessed, wherein the accessing, the searching, and the determining are performed corresponding to each of the plurality of motion vector predictors, to form a plurality of refined motion vectors, and one of the plurality of refined motion vectors is selected for encoding the current block.

When searching around the initial motion vector, one of (1) discontinuity between a prediction for the current block and a reconstructed block adjacent to the current block; and (2) gradients at one of the prediction block and the reconstructed block is used to determine the refined motion vector for the current block. The one or more searching positions may be determined based on the first resolution and the second resolution.

If the motion vector predictor is at a second resolution, the motion vector predictor can be converted to a resolution lower than the first resolution, for example, by rounding the motion vector predictor. The motion vector predictor can be based on an average of at least two motion vectors of decoded blocks adjacent to the current block.

The present embodiments also provide an apparatus for performing these methods.

The present embodiments also provide a non-transitory computer readable storage medium having stored thereon instructions for performing any of the methods described above.

The present embodiments also provide a bitstream generated according to any of the methods described above.

DETAILED DESCRIPTION

Figure 1:
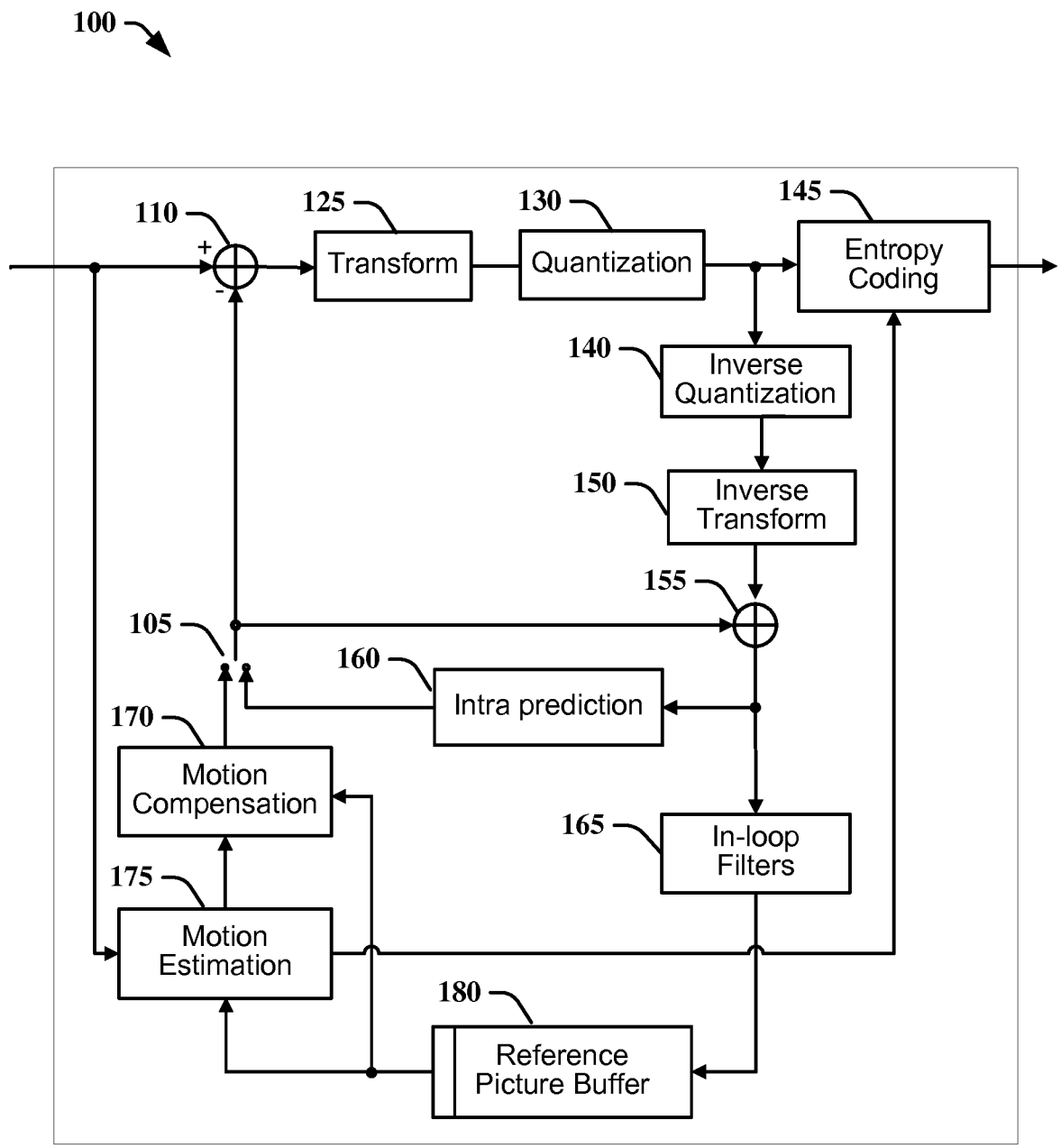
FIG. 1 illustrates an exemplary HEVC (High Efficiency Video Coding) encoder.

FIG. 1 illustrates an exemplary HEVC (High Efficiency Video Coding) encoder 100. To encode a video sequence with one or more pictures, a picture is partitioned into one or more slices where each slice can include one or more slice segments. A slice segment is organized into coding units, prediction units and transform units.

The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock, a partition and a sub-block as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference pixels can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference index) can be signaled in two methods, namely, "merge mode" and "advanced motion vector prediction (AMVP)."

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figure 2A:
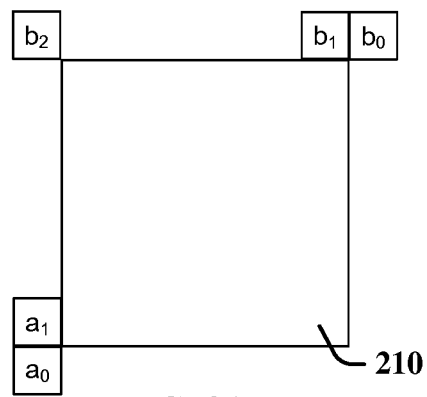
FIG. 2A is a pictorial example depicting the positions of five spatial candidates $\{a_1, b_1, b_0, a_0, b_2\}$ for a current block.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210. For each candidate position, the availability is checked according to the order of $a_1, b_1, b_0, a_0, b_2$, and then the redundancy in candidates is removed.

The maximum number of merge candidates N is specified in the slice header. If the number of merge candidates is larger than N, only the first N−1 spatial candidates and the temporal candidate are used. Otherwise, if the number of merge candidates is less than N, the set of candidates is filled up to the maximum number N.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD.

Only two spatial motion candidates are chosen in AMVP. The first spatial motion candidate is chosen from left positions $\{a_0, a_1\}$ and the second one from the above positions $\{b_0, b_1, b_2\}$, while keeping the searching order as indicated in the two sets. If the number of motion vector predictors is not equal to two, the temporal MV prediction candidate can be included. If the temporal candidate is not available, a zero motion vector is used to fill the set of candidates.

Figure 2B:
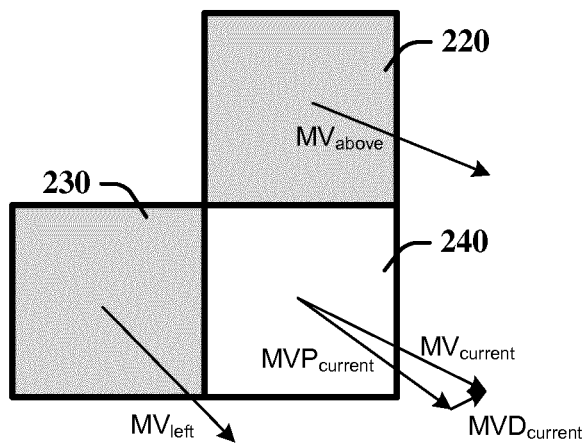
FIG. 2B is a pictorial example depicting an exemplary motion vector representation using AMVP (Advanced Motion Vector Prediction)

FIG. 2B illustrates an exemplary motion vector representation using AMVP. For a current block to be encoded (240), a motion vector ($MV_{current}$) can be obtained through motion estimation. Using the motion vector ($MV_{left}$) from a left block (230) and the motion vector ($MV_{above}$) from the above block (220), a motion vector predictor can be chosen as $MVP_{current}$. A motion vector difference then can be calculated as $MVD_{current} = MV_{current} - MVP_{current}$.

In HEVC, the precision of the motion information for motion compensation is one quarter-sample (also referred to as quarter-pel or ¼-pel) for the luma component and one eighth-sample (also referred to as ⅛-pel) for the chroma components. A 7-tap or 8-tap interpolation filter is used for interpolation of fractional-sample pixel positions, i.e., ¼, ½ and ¾ of full pixel locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. A filter (165) is applied to the reconstructed picture, for example, to perform deblocking/SAO (Sample Adaptive Offset) filtering to reduce blockiness artifacts. The filtered image is stored at a reference picture buffer (180).

Figure 3:
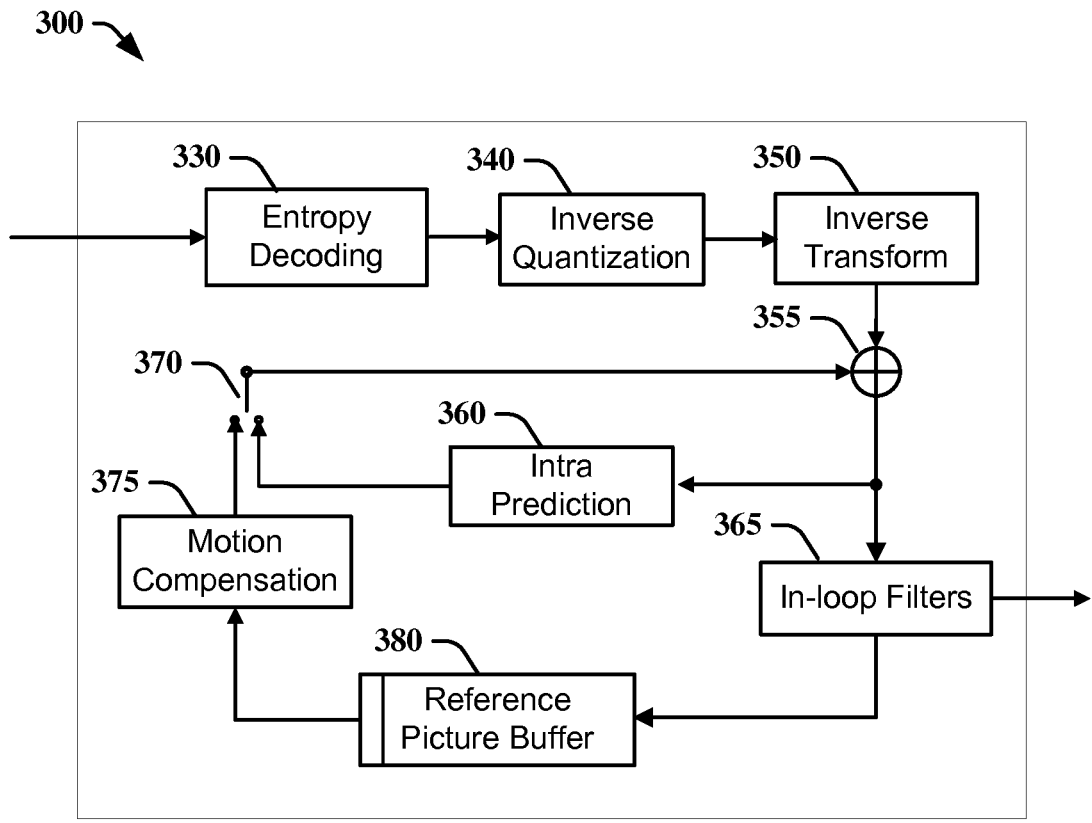
FIG. 3 illustrates a block diagram of an exemplary HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer pixels of a reference block. A filter (365) is applied to the reconstructed image. The filtered image is stored at a reference picture buffer (380).

Figure 2C:
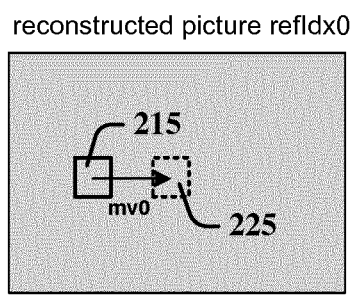
FIG. 2C is a pictorial example depicting motion-compensated prediction.
Figure 2C:
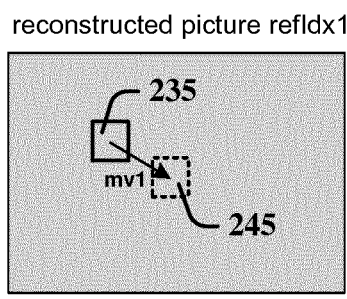
Figure 2C:
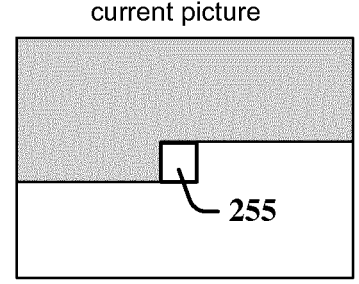

In video compression, the inter prediction mode allows for predicting one block (for example, Prediction Unit) using at least one motion compensated block from previously reconstructed/decoded pictures. For example, as illustrated in FIG. 2C, a current block (255) is encoded using the inter prediction mode, blocks 225 and 245 are co-located blocks in reference pictures, and blocks 215 and 235 are blocks used for motion-compensated prediction. At least one reference index (e.g., refIdx0) identifying a reconstructed picture in the Decoded Pictures Buffer (DPB) and one motion information (Motion Vector Difference, MVD) are encoded, to enable reconstruction of at least one motion vector (MV, e.g., mv0) at the decoder. When bi-prediction is used, addition reference index (e.g., refIdx1) and motion information are encoded in order to reconstruct the motion vectors (e.g., mv0 and mv1). In some cases, the motion vectors can be inferred from previously decoded data (e.g., merge mode in HEVC).

The reconstruction of MV values can be performed as follows:

$$MV_X = MVP_X + MVD_X, \quad MV_Y = MVP + MVD_Y, \quad (1)$$

where $MV_X$ and $MV_Y$ are the horizontal and vertical motion vector components, respectively, MVP ($MVP_X$, $MVP_Y$) is the motion vector predictor built from previously reconstructed data, and MVD ($MVD_X$, $MVD_Y$) is the motion vector difference that is encoded and transmitted in the bitstream.

The MVD values are usually encoded at a precision corresponding to the decoded MV values. For example, HEVC uses one-quarter pixel (i.e., ¼-pel) as the motion vector resolution.

Increasing the MV resolution, for example, from ¼-pel to ⅛-pel, can improve the prediction in general. However, for low bit rates, the coding of the MVD data can have a relatively high bitrate cost with respect to other data encoded per block. Thus, the overall compression efficiency may not necessarily improve with the MV resolution.

To improve the compression efficiency, there are some existing works on using adaptive motion resolution, for example, to choose a motion resolution between integer pel or ¼-pel, or to choose between ¼-pel and ⅙-pel. However, indicating which motion vector resolution is used may cause a degradation in compression efficiency because of the extra side information that needs to be sent in the bitstream.

To reduce overhead, an article by Lakshman, Haricharan, et al., entitled "Conditional motion vector refinement for improved prediction," Picture Coding Symposium (PCS), 2012. IEEE (hereinafter "Lakshman"), defines a set of rules known to both the encoder and decoder to infer the MV resolution, between quarter-sample MV resolution and ⅙-sample MV resolution, without any explicit block-by-block forward signaling. A high resolution MV is transmitted as a regular quarter-sample MV augmented with refinement information, which increases the resolution of the motion vectors from a quarter-sample resolution to one-sixth of a sample. The reconstructed MV components that point to integer or half-sample positions are left unaltered. For the MV components that point to one-quarter or three-quarter positions, the decoder infers the presence of refinement using the following conditions:

In case of a P-slice, the MV refinement information is always sent.

In case of a Bi-prediction, the MV refinement is sent for the predictions that access samples from a reference picture that contains high texture.

In case of Bi-predictions not accessing high texture reference pictures, the MV refinement is sent only for pictures from a pre-defined reference picture list.

For single hypothesis predictions in B-slices, MV refinement is not used.

An article by Chen, Jianle, et al., entitled "Further improvements to HMKTA-1.0," VCEG-AZ07, ITU-T/SG16 Video Coding Experts Group (VCEG) 52nd Meeting: 19-26 Jun. 2015, Warsaw, Poland (hereinafter "Chen"), describes an Advanced Motion Vector Resolution (AMVR) mode. In particular, MVD between the motion vector and predicted motion vector of a PU can be coded with either quarter-pel resolution or integer-pel resolution. The MVD resolution is controlled at coding unit (CU) level and an integer MVD resolution flag is conditionally signaled for each CU that has at least one non-zero MVD components. When the integer MVD resolution flag is false, or not coded for a CU, the default quarter-pel MV resolution is used for all PUs belonging to the CU. Otherwise, all PUs coded with AMVP mode belonging to the CU use integer MV resolution, while the PUs coded with merge mode still use quarter-pel MV resolution. When a PU uses integer MV resolution, the AMVP candidate list is filled with integer MV by rounding quarter-pel MVs to integer-pel MVs.

The present principles are directed to motion vector refinement in video encoding and decoding. In one embodiment, a first resolution MVD (for example, ¼-pel) is received in the bitstream, and the decoder obtains an initial motion vector based on the MVD, and refines the initial motion vector to obtain a second motion resolution (for example, ⅛-pel) higher than the first resolution, using already decoded neighboring samples. The refinement of motion information is also performed at the encoder to avoid mismatch. Because the motion refinement is performed at both the encoder and decoder, no additional information is transmitted in the bitstream to indicate the motion refinement, for example, no explicit signaling is used to indicate the refinement of a motion vector from ¼-pel to ⅛-pel. In a variant, merge mode is used for the current block (i.e., no MVD is received in the bitstream), and the initial motion vector is obtained as a motion vector predictor in the candidate list (possibly rounded to the first resolution) is refined to obtain the second motion resolution.

The motion information refinement may be performed using motion estimation at the encoder or decoder. Comparing with an approach that uses the first motion resolution (for example, ¼-pel) without motion resolution refinement, the proposed embodiment may improve the motion accuracy without the overhead of transmitting the refinement motion information. Comparing with an approach that uses the second motion resolution (for example, ⅛-pel) without motion resolution refinement at the decoder, the proposed embodiment may reduce the overhead of transmitting the motion refinement information. It should be noted that the decoder according to the present principles may also perform motion search, and thus may be more complex than a decoder that does not need motion search.

Figure 4:
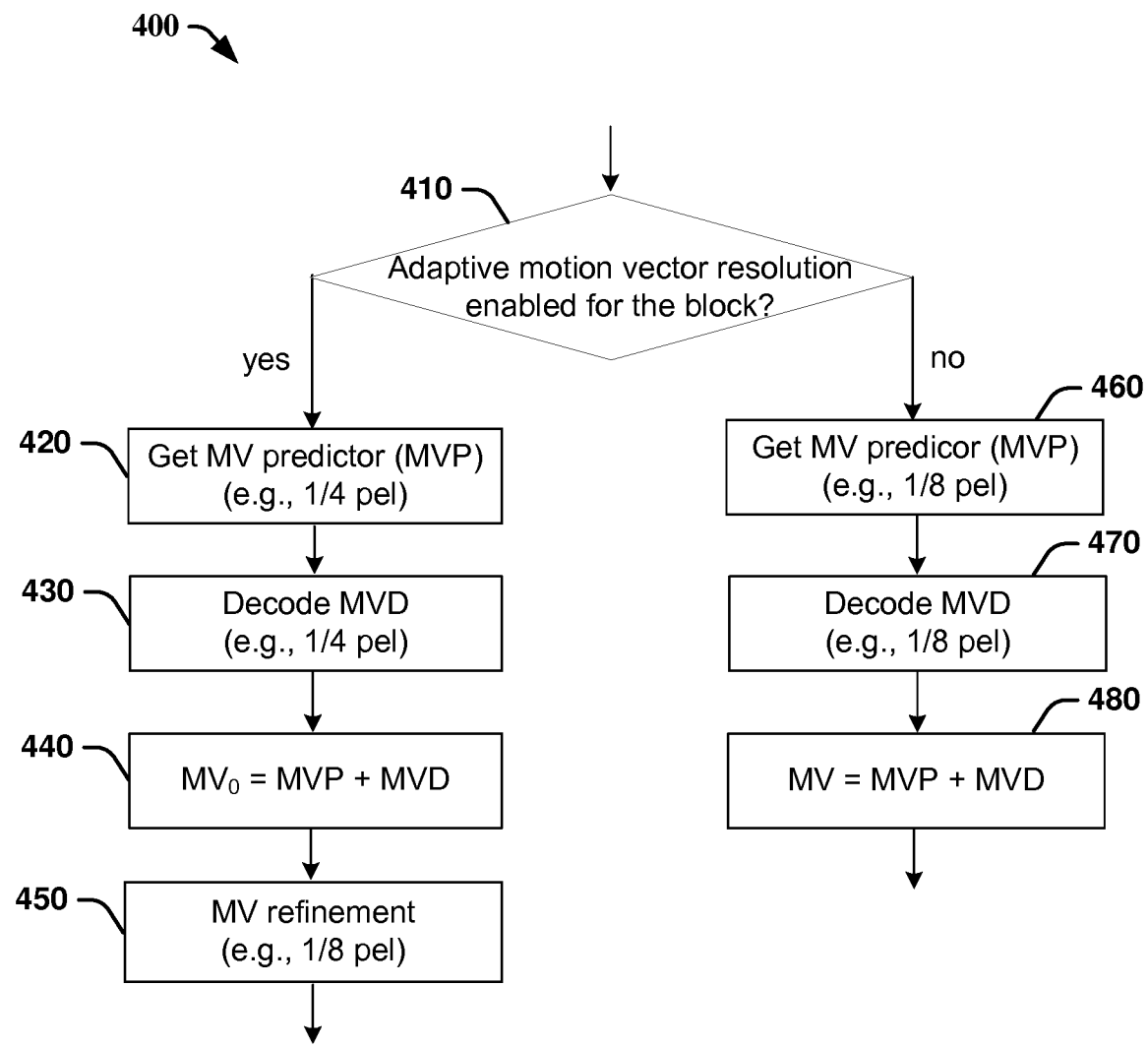
FIG. 4 illustrates an exemplary method for performing motion vector refinement at a decoder, according to an embodiment of the present principles.

FIG. 4 illustrates an exemplary method 400 for performing motion vector refinement at a decoder, according to an embodiment of the present principles. In this example, we suppose a decoder can refine a motion vector resolution from ¼-pel to ⅛-pel. It should be noted that the present principles can be applied to refinement between other motion resolutions, for example, but not limited to, from integer-pel to ¼-pel, from ¼-pel to ⅙-pel.

For a block to be decoded, the decoder checks whether adaptive motion vector resolution is enabled (410), for example, using a flag in the bitstream, or using the existing methods as described above. If adaptive motion vector resolution is enabled, the decoder generates MV predictor (MVP) at ¼-pel resolution (420), for example, using the AMVP mode of HEVC. If the predictor is at ⅛-pel, it is rounded to ¼-pel. The decoder then decodes MVD at ¼-pel resolution (430). An initial motion vector can be obtained (440) as $MV_0 = MVP + MVD$. Then the initial motion vector ($MV_0$) can be refined to ⅛-pel resolution (450) and be used for motion-compensated prediction.

At 420, the MV predictors may also be generated at ⅛ pel. Whether the MV predictor is generated at ¼-pel or ⅛-pel should be consistent with what the encoder has used.

The samples of a motion-compensated prediction block are obtained from those of a corresponding block at a position displaced by the motion vector in a reference picture identified by a reference picture index. When the motion vector is not an integer, fractional sample interpolation is used to generate the prediction samples.

HEVC supports motion vectors at ¼-pel. Let us represent a motion vector as MV=iMV+sMV, where iMV is the integer part of MV and sMV is the ¼-pel part (first motion resolution), sMV=p/4, p=0, 1, 2, 3, then the interpolated sample value can be calculated as:

$$\text{Ival}[x] = \sum_{i=0}^{N-1} c[p][i] \times s[x + iMV - N/2 + i] \qquad (2)$$

where x is the pixel location, c[p][i], i=0, ..., N−1, are the filter coefficients corresponding to the p/4-pel position and N is the number of filter taps. The filter coefficients for 1/4-pel interpolation in HEVC are as follows:
c[p=0][ ]={0, 0, 0, 64, 0, 0, 0, 0}, corresponding to integer position, and there is only scaling,
c[p=1][ ]={−1, 4, −10, 58, 17, −5, 1, 0}, corresponding to ¼-pel position, and a 7-tap filter,
c[p=2][ ]={−1, 4, −11, 40, 40, −11, 4, −1}, corresponding to ½-pel position, and a 8-tap filter,
c[p=3][ ]={0, 1, −5, 17, 58, −10, 4, −1}, corresponding to ¼-pel position, and a 7-tap filter.

When using a higher resolution ⅛-pel, ⅛-pel interpolation filter is used to interpolate the ⅛-pel part, including sMV=p/8, p=0, 1, 2, 3, 4, 5, 6, 7, 8. For example the following ⅛-pel interpolation filters (N=4) can be used:

$$c[p=0][\ ] = \{0, 64, 0, 0\},$$

$$c[p=1][\ ] = \{-2, 58, 10, -2\},$$

$$c[p=2][\ ] = \{-4, 54, 16, -2\},$$

$$c[p=3][\ ] = \{-6, 46, 28, -4\},$$

$$c[p=4][\ ] = \{-4, 36, 36, -4\},$$

$$c[p=5][\ ] = \{-4, 28, 46, -6\},$$

$$c[p=6][\ ] = \{-2, 16, 54, -4\},$$

$$c[p=7][\ ] = \{-2, 10, 58, -2\}.$$

The motion refinement process may be regarded as motion estimation, with a range related to the motion resolution before refinement. For example, when a motion vector is refined from a first resolution of ¼-pel to a second resolution of ⅛-pel, the motion search range include candidates around the initial motion vector. More generally, the search candidates for motion refinement can be $MVX_0 - \Delta MVX \sim MVX_0 + \Delta MVX$, $MVY_0 - \Delta MVY \sim MVY_0 + \Delta MVY$, in the horizontal direction and vertical direction, respectively, wherein $MVX_0$ and $MVY_0$ are horizontal and vertical components of the initial motion vector $MV_0$, respectively, and $\Delta MVX$ and $\Delta MVY$ define the search range in the horizontal and vertical directions, respectively.

Figure 5:
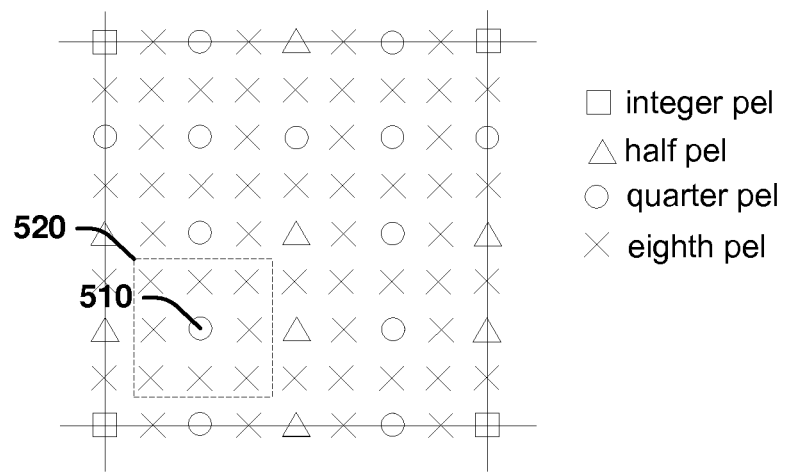
FIG. 5 is a pictorial example depicting pixel positions for integer pixels, half pixels, quarter pixels and eighth pixels.

For example, the refinement candidates in the horizontal direction can be ($MVX_0 - k \times \text{step2}$, $MVX_0 + k \times \text{step2}$, where k is an integer and is defined as $$-\text{step1} < (k * \text{step2}) < \text{step1}, \qquad (3)$$

where step1 is the first resolution, and step2 is the second resolution. When step1=¼ and step2=⅛, −2<k<2. FIG. 5 illustrates pixel positions for integer pixels, half pixels, quarter pixels and eighth pixels. For ease of notation, we may also refer to those candidates as motion refinement candidates, and we denote a predicted block built by motion compensation with a motion refinement candidate as a motion-refinement predicted block and samples within a motion-refinement predicted block as motion-refinement prediction samples.

An exemplary set of search candidates includes the positions within box 520 when (MVX$_0$,MVY$_0$,) corresponds to position 510. The search range, and more generally, the set of search candidates can be different from what is shown in FIG. 5. The same set of search candidates should be used at the encoder and decoder.

If adaptive motion vector resolution is not enabled, the decoder obtains MVP and MVD at a motion resolution that is used for the decoded motion vector, and no motion refinement is performed at the decoder. As shown in FIG. 4, the decoder may get (460, 470) both MVP and MVD at ⅛-pel resolution, and decode (480) the motion vector at ⅛-pel resolution as MV=MVP+MVD. In a variation, the decoder may get (460, 470) both MVP and MVD at ¼-pel resolution, and decode (480) the motion vector at ¼-pel resolution as MV=MVP+MVD.

In the following, we describe several embodiments that can be used to perform motion vector refinement (450) in further detail.

To refine the motion vector at the decoder, we use the characteristics that a picture signal usually is smooth and continuous. Thus, at the decoder side, if a motion vector is accurate, a decoded block typically should be continuous with respect to the neighboring blocks. In one embodiment, we use the reconstructed neighboring samples to refine the MV. In particular, a set of search candidates as described above are evaluated by measuring the discontinuity between the predicted block built by motion compensation with motion refinement candidates and the previously reconstructed samples, for example, the samples of the neighboring upper and left blocks as illustrated in FIG. 6A.

Figure 6A:
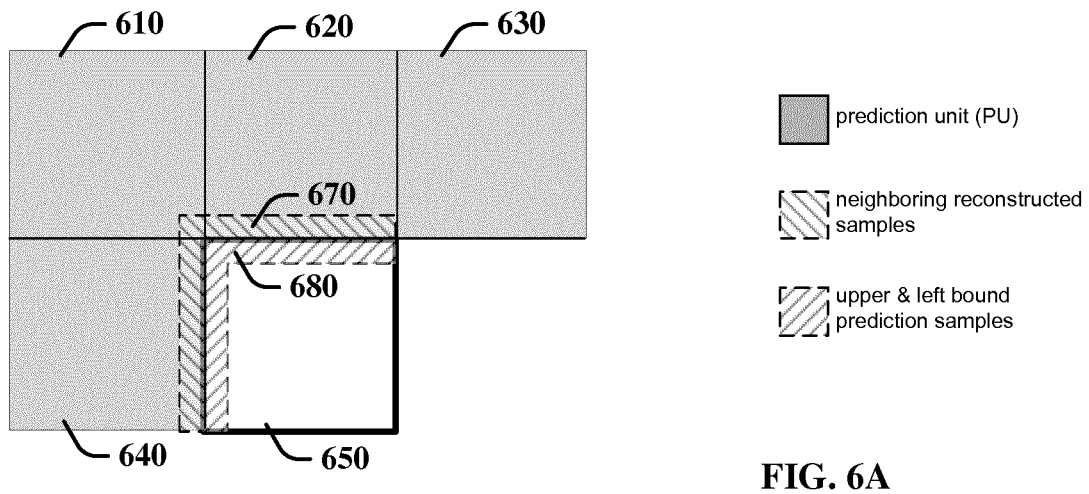
FIG. 6A illustrates an exemplary PU to be decoded.

FIG. 6A illustrates an exemplary PU (650) to be decoded. Other PUs (610, 620, 630, 640) above, or to the left of, the current PU are already decoded, and are available for decoding the current PU. In particular, an L-shape set of decoded samples (670) in neighboring blocks (610, 620, 640) may be used for refining the motion vector for the current PU (650). It should be noted that PUs can be in different sizes or shapes from what are shown in FIG. 6A, and a larger or smaller set of neighboring reconstructed samples can be used for refining motion vector for the current PU. In the present application, we use an L-shape set of samples for motion refinement. More generally, different sets of samples can be used for motion refinement, and the refinement can be applied to a block.

Figure 6B:
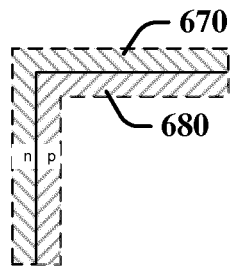
FIG. 6B is a pictorial example illustrating an L-shape set of neighboring reconstructed samples and an L-shape set of prediction samples for measuring discontinuity.

In one embodiment, we use the discontinuity based on the L-shape set of decoded samples (670) in neighboring blocks (referred to as "neighboring L-shape") and an L-shape set of samples (680) in a current prediction block. The discontinuity can be measured as the Sum of Absolute Difference (SAD) between the reconstructed samples (n) and the closest motion-refinement prediction sample (p), as illustrated in FIG. 6B. Mathematically, the refined motion vector difference can be calculated as:

$$MVD^*_{refine} = \underset{MVD_{refine}}{\operatorname{argmin}} \sum_p |I_{ref}(p + MVP + MVD + MVD_{refine}) - I_{rec}(n)| \quad (4)$$

where p is a motion-refinement prediction sample in the L-shape of the PU with a location at $(x_p, y_p)$, $\sum_p | \ |$ is a summation over the L-shape set of the PU, MV$_0$=MVP+ MVD is the motion vector to be refined, n is the reconstructed sample in the L-shape next to p with a location at $(x_n, y_n)$ (for example $x_n=x_p-1, y_n=y_p$, if p belongs to the left bound of the PU, and $x_n=x_p, y_n=y_p-1$, if p belongs to the upper bound of the PU), $I_{rec}(n)$ is the reconstructed (or decoded) sample value of the current picture, $I_{ref}(p+MVP+MVD+MVD_{refine})$ is the motion-compensated prediction value when MVD$_{refined}$ is selected.

In a variation, we consider the sum of the residual and the motion-compensated prediction block, and $I_{ref}(p+MV_0+MVD_{refine})+Res(p)$ would be the reconstructed value for sample p if MVD$_{refine}$ is selected. Then the refined motion vector difference can be calculated as:

$$MVD^*_{refine} = \underset{MVD_{refine}}{\operatorname{argmin}} \sum_p |I_{ref}(p + MVP + MVD + MVD_{refine}) + Res(p) - I_{rec}(n)| \quad (5)$$

where Res(p) is the residual at sample p.

When an HEVC decoder is modified to include the motion vector refinement according to the present principles, MV$_0$ can be set to MVD+MVP in AMVP or the one signaled in the candidate list in merge mode, wherein MVD and MVP are obtained as specified by HEVC. Generally, MV$_0$ is the motion vector the decoder obtained without performing motion search at the decoder.

Motion refinement can be viewed as motion search at the decoder, with a set of candidate motion vectors, at a higher motion resolution, selected from around the initial motion vector. The choice of a best motion vector may be the one that minimizes a certain criterion, for example, the discontinuity measure as described in Eq. (4) or (5). That is, after an initial motion vector MV$_0$ is obtained, a motion search is further performed to refine the initial motion vector. The extra complexity in a decoder is usually small because only a small set of search candidates around the initial motion vector needs to be checked.

Mathematically, the derived refined MV can be expressed as:

$$MV = MV_0 + MVD^*_{refine} \quad (6)$$

Then the block corresponding to the refined MV in the reference picture is used as the prediction block for decoding the PU, for example, using the interpolation filters as described above. Typically, motion refinement enables an encoder to encode an MVD at a low resolution, and thus reduces the cost of encoding motion information compared with encoding MVD at a full resolution, while the decoder can still recover the MV at a full resolution.

In the present application, we use SAD as a difference measure in various embodiments. It should be noted that other difference measures, for example, but not limited to, Sum of Squared Error (SSE), can be used instead of SAD.

In another embodiment, we use the property that gradients at adjacent pixels are usually similar, and we compute local gradients at locations (n) and (p) to measure the discontinuity. Assuming that the signal (i.e., picture samples) is spatially stationary, one can locally model the signal as a Taylor series, truncated to the linear term:

$$I(x+d) = I(x) + g(x) \cdot d \quad (7)$$

where I(x) is the picture sample value at location x, g is a 2×2 matrix estimated with local gradients.

Figures 7A, 7B:
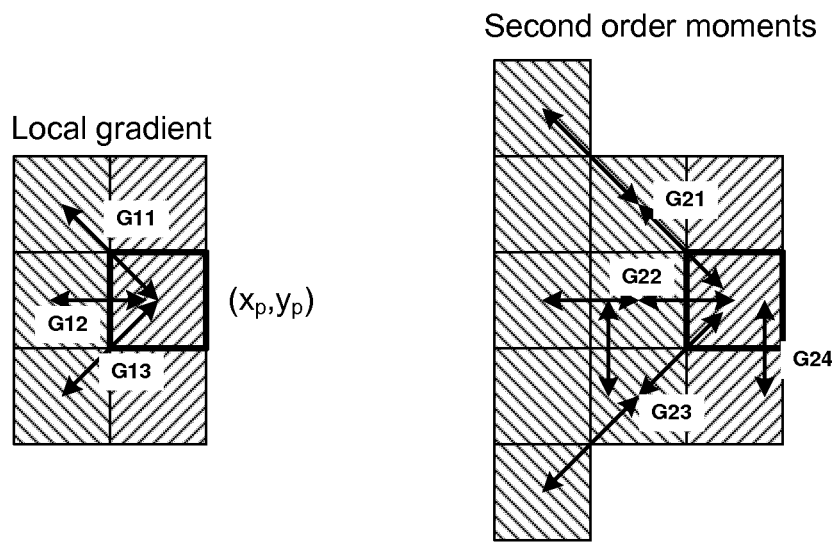
FIG. 7A is a pictorial example illustrating local gradients.
FIG. 7B is a pictorial example illustrating second order moments of gradients.

Using Eq. (7), the relation between the neighboring reconstructed samples R(x) and the motion-refinement predicted block P(x) becomes:

$$R(n)=P(p)+g(p)\cdot(n-p) \quad (8)$$

with $P(p)=I_{ref}(p+MV_0+MVD_{refine})$, and $R(n)=I_{rec}(n)$. In a variation, the residuals can be included when calculating $P(p)$. The local gradients at position $p=(x_p, y_p)$ can be expressed as shown in FIG. 7A:

$$G11(p)=R(n)-P(p), \text{ with } n=(x_p-1,y_p-1)$$

$$G12(p)=R(n)-P(p), \text{ with } n=(x_p-1,y_p)$$

$$G13(p)=R(n)-P(p), \text{ with } n=(x_p-1,y_p+1)$$

Then the sum of the absolute value of the local gradients can be used to calculate the discontinuity, and the motion vector refinement that minimizes the discontinuity is chosen:

$$MVD^*_{refine} = \underset{MVD_{refine}}{\operatorname{argmin}} \sum_p \{|G11(p)|+|G12(p)|+|G13(p)|\} \quad (9)$$

The second order moments at position $p=(x_p, y_p)$ can be expressed as shown in FIG. 7B (when n and p are located at the vertical left boundary of the L-shape):

$$G21(p)=R(n2)-R(n)-G11, \text{ with } n=(x_p-1,y_p-1) \text{ and } n2=(x_p-2,y_p-2)$$

$$G22(p)=R(n2)-R(n)-G12, \text{ with } n=(x_p-1,y_p) \text{ and } n2=(x_p-2,y_p)$$

$$G23(p)=R(n2)-R(n)-G13, \text{ with } n=(x_p-1,y_p+1) \text{ and } n2=(x_p-2,y_p+2)$$

$$G24(p)=R(n2)-R(n)-P(p)+P(p2), \text{ with } n=(x_p-1,y_p) \text{ and } n2=(x_p-1,y_p+1) \text{ and } p2=(x_p, y_p+1).$$

When sample p is at the upper boundary of the PU, the gradients can be derived similarly. For the upper-left corner, it can be processed as it is at the left or upper boundary or can be processed twice (once as the boundary, and once as the upper).

Then the sum of the absolute value of the second order moments of the gradients can be used to calculate the discontinuity, and the motion vector refinement that minimizes the discontinuity is chosen:

$$MVD^*_{refine} = \underset{MVD_{refine}}{\operatorname{argmin}} \sum_p \{|G21(p)|+|G22(p)|+|G23(p)|+|G24(p)|\} \quad (10)$$

The discontinuity can also be calculated as the sum of the absolute value of the local gradients and second order moments:

$$MVD^*_{refine} = \quad (11)$$

$$\underset{MVD_{refine}}{\operatorname{argmin}} \sum_p \{|G11(p)|+|G12(p)|+|G13(p)|+|G21(p)|+|G22(p)|+|G23(p)|+|G24(p)|\}$$

It should be noted that the present principles can also be applied to other forms of gradient calculation.

Figure 8:
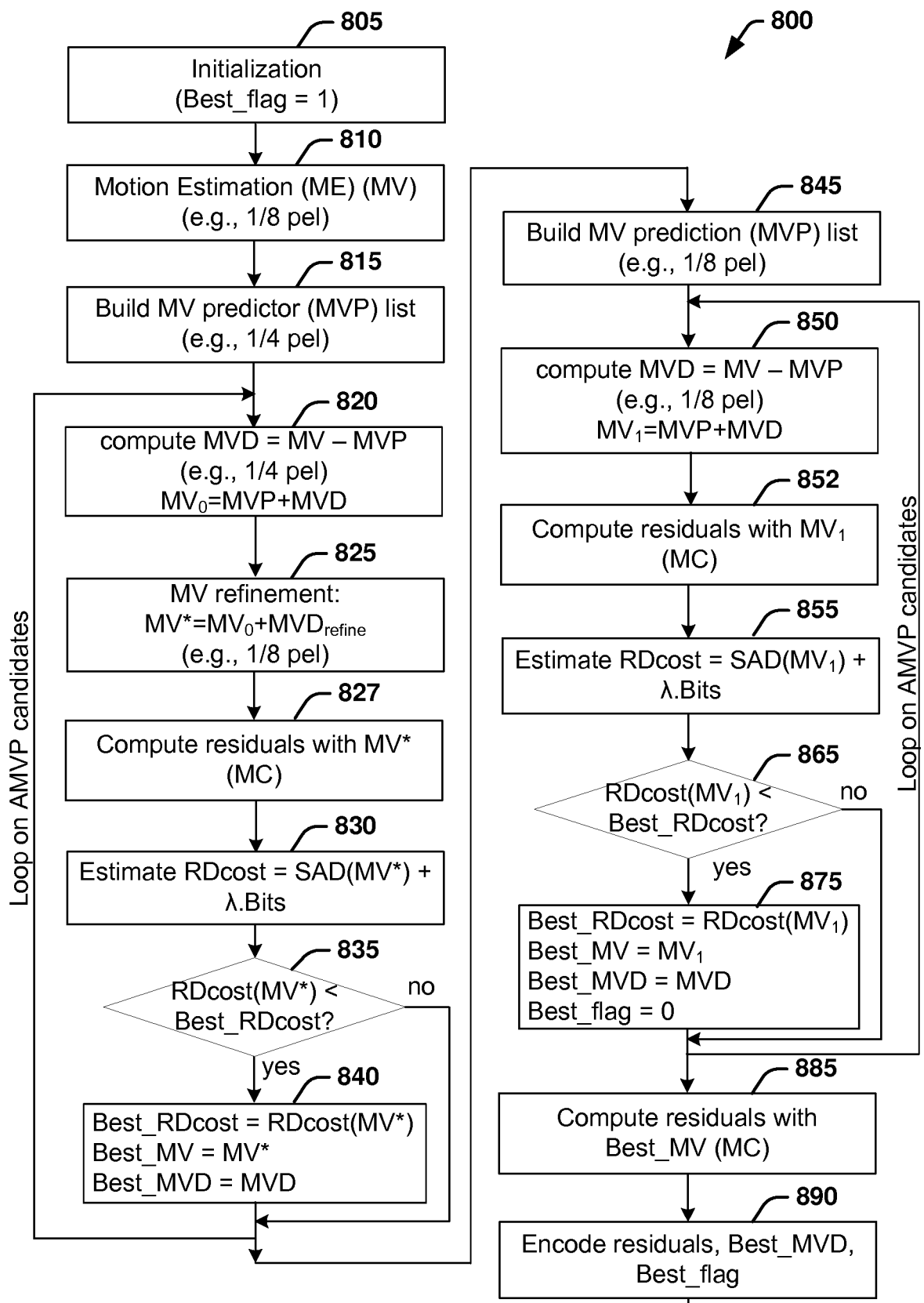
FIG. 8 illustrates an exemplary method for performing motion vector refinement at an encoder, according to an embodiment of the present principles.

FIG. 8 illustrates an exemplary method 800 for performing motion vector refinement at an encoder, according to an embodiment of the present principles. The output of method 800 may be used as an input bitstream to method 400. At the initialization step (805), the encoder may access a video sequence to be encoded as input. Additionally, the encoder may set the parameters to initial values, for example, set Best_flag=1, and set Best_RDcost to a large value.

Motion estimation (810) is performed at the ⅛-resolution to obtain a motion vector (MV). The encoder then checks whether it is more efficient to encode the motion vector using adaptive motion refinement or not. From steps 820-840, the encoder checks the MV encoding cost with motion refinement, for example, using the RD (Rate-Distortion) cost.

From steps 845-875, the encoder checks the MV encoding cost without motion refinement. Then motion compensation is performed based on the final MV (Best_MV) and the residuals can be calculated (885). The residuals, the final MVD (Best_MVD) and the adaptive motion refinement flag (Best_flag) are encoded (890) into the bitstream.

More particularly, at step 815, a motion vector predictor list is built at the ¼-pel resolution, for example, using the motion vector predictor candidate list from AMVP, a rounded version of a ⅛-pel initial motion vector predictor or an average of neighboring motion vectors, consistent with how a corresponding decoder builds the motion vector predictor list. Lowering the resolution may make the motion vector predictor into a more "correlated" one (i.e., the motion vector predicted can be accurately predicted such that just an index may be transmitted to indicate the motion vector predictor), and let the motion refinement to obtain the high resolution part (i.e., the less "correlated" portion). The MVP list may contain only one MVP in some cases. For each MVP in the MVP list, a motion vector difference (MVD) is calculated (820) as MVD=MV−MVP, and an initial motion vector can be calculated as $MV_0$=MVP+MVD.

In a variation, the motion vector predictor candidate list may be built at ⅛-pel resolution at step 815, and the motion vector difference MVD is rounded to ¼-pel at step 820. Note that $MV_0$ may be different from MV because of the rounding applied to the MVP or MVD.

The refinement is performed (825) to obtain $MVD_{refine}$, for example, as described in Eq. (4) or (5), and a refined motion vector as $MV^*$=MV0+$MVD_{refine}$. The residuals can then be calculated (827) based on $MV^*$. The encoding cost of the adjusted motion vector ($MV^*$) can be estimated using RD (Rate-Distortion) cost at step 830. At step 835, the encoder checks whether the current adjusted motion vector has a smaller RD cost than the current Best_RDcost. If yes, parameters Best_RDcost, Best_MV, Best_MVD are set to the current RD cost, current adjusted motion vector, and current MVD, and some other relevant encoding information may also be stored.

At step 845, a motion vector predictor list is built at the ⅛-pel resolution, for example, using the motion vector predictor candidate list from AMVP. Step 845 is similar to step 815, except that the encoder does not adjust the motion resolution to ¼-pel. For each MVP in the MVP list, the MVD is calculated (850) based on the MVP at the ⅛-pel resolution. The residuals can be calculated (852) for the motion vector $MV_1$=MVP+MVD and the encoding cost of the motion vector $MV_1$ can be estimated using RD cost at step 855. At step 865, the encoder checks whether the current motion vector has a smaller RD cost than the current Best_RDcost. If yes, parameters Best_RDcost, Best_MV and Best_MVD are set to the current RD cost, current motion vector, and current MVD, and the adaptive motion refinement flag is set to false (0). Other relevant encoding information may also be stored.

When MVD is 0, for example, when the merge mode is used, steps 820 and 850 are not needed, and at step 840 and 875, Best_MVD does not need not to be calculated, and at step 890, Best_MVD does not need to be encoded.

The motion refinement can be applied to all motion vectors corresponding to the motion vector predictors, or can be applied to a subset. For example, motion refinement is used for AMVP motion vector predictors only, or to the merge mode only.

In method 800, the encoder decides whether to use adaptive motion refinement based on the encoding cost and signals the choice through a flag in the bitstream. In other embodiments, the encoder may decide whether to use adaptive motion refinement based on the video characteristics without checking the encoding cost, for example, as described further below or in Lakshman and Chen. Consequently, the encoder may only need to perform part of method 800 (for example, the part with motion refinement, or the part without motion refinement).

Note that an additional syntax element Best_flag may need to be sent according to method 800. However, sending Best_flag may still be more efficient than sending the MVD at the ⅛-pel resolution since the high-resolution portion of the motion vector usually is random and expensive to encode.

By refining the motion vector, the encoder can reach a ⅛-pel motion resolution while the motion vector difference MVD is transmitted in the bitstream at a ¼-pel motion resolution. Accordingly, the MVD may require fewer bits to be encoded. For example, as shown in TABLE 1, a motion vector (MV) for a current block from the motion estimation (810) is 3.625, a motion vector predictor list (815) includes {3.0, ... }. For the motion vector predictor $MVP_0$=3.0, when motion refinement is not enabled, MVD (850) is MV−MVP=0.625 (coded at ⅛-pel). On the other hand, when motion refinement is enabled, MVD is rounded to 0.5 (¼-pel) and the initial motion vector (820) $MV_0$=MVP+MVD=3.5. The motion vector $MV_0$ then is refined (825) to MV*=3.625. In this example, the refined motion is the same as the MV obtained from motion estimation and the MVD is transmitted at ¼-pel, and thus may need fewer bits than when no motion refinement is used (i.e., the MVD is transmitted at ⅛-pel). Consequently, the encoder is likely to choose to enable motion refinement.

TABLE 1

|  | Resolution | Example |
| --- | --- | --- |
| MVP list (left, upper) | ¼ | {3.0 ...} |
| MVP | ¼ | 3.0 |
| MVD | ¼ | 0.5 |
| MV* | ⅛ | 3.625 |
| MV from ME | ⅛ | 3.625 |
| MV for MC | ⅛ | 3.625 |

In the above example, the refined motion vector is the same as the motion vector from motion estimation. It should be noted the refined motion vector may be different from the motion vector obtained from motion estimation.

MVP Refinement

In the above, we discuss refinement to an initial motion vector that is generated based on a motion vector predictor MVP and a motion vector difference MVD. In another embodiment, the refinement can be performed with respect to the motion vector predictor (without including MVD).

Referring back to FIG. 6, after an initial motion vector predictor ($MVP_0$) is obtained, for example, using AMVP as specified by HEVC, the motion vector predictor can be refined using the reconstructed L-shape (670).

In particular, the decoder may form an MC L-shape (680) corresponding to a motion vector predictor around the initial motion vector predictor, for example, $MVP_0+\Delta MV, \Delta MV$={(−⅛,0), ... ,(0,⅛)}. Then the decoder can compare a difference, for example, the discontinuity or gradients as discussed above, between the reconstructed L-shape (670) and different MC L-shapes (680), and choose the motion refinement ($\Delta MV^*$) that yields the smallest difference as the refinement to the initial motion vector predictor, that is, the refined motion vector predictor can be calculated as $MVP^*=MVP_0+\Delta MV^*$. Note that both the reconstructed L-shape (670) and MC L-shape (680) are based on decoded samples, such that the same process can be performed at both the encoder and decoder sides.

Generally, the motion refinement for the motion vector predictor can be viewed as a motion search with a search range including a few sub-sample displacements at a full motion resolution around the initial motion vector predictor. For example, a motion vector predictor $MVP_0$ at 510 may be refined using the search candidates within 520 as illustrated in FIG. 5. Similarly to refining the motion vector (with MVD), different sets of search candidates may be used from what is shown in FIG. 5.

In a variation, the motion refinement can be performed on a rounded version of the initial motion vector predictor (round($MVP_0$)), and the search range for the motion refinement includes sub-sample displacements at a full motion resolution around the rounded motion vector predictor. For example, when the refined motion resolution is ⅛ pel, the rounded version of $MVP_0$ may be at an interger-pel, half-pel or quarter-pel resolution. This is because the actual motion vector is more likely to be concentrated around a motion vector at the lower resolution, and the rounded version of the initial motion vector predictor may provide a better starting point for search.

In another variation, the motion refinement may be performed with respect to an average value of neighboring motion vectors that are used in the MVP candidate list. For example, the motion refinement may use an average of the left and above motion vectors ($MV_{left}+MV_{above}$)/2 as the initial motion vector predictor, and then perform a motion search around the initial motion vector predictor. We observe that motion refinement is usually selected in an almost, or relatively, uniform motion area. By averaging the motion vectors adjacent to the current block, we may provide a better starting point for search. When motion refinement is selected, i.e., when the motion field is uniform, the predictor candidate list may be reduced to use only one (left or above) candidate in the list, and thus, reducing the number of possible candidates. This may improve the compression efficiency as no index of the AMVP list needs to be encoded or transmitted in the bitstream.

Figure 9:
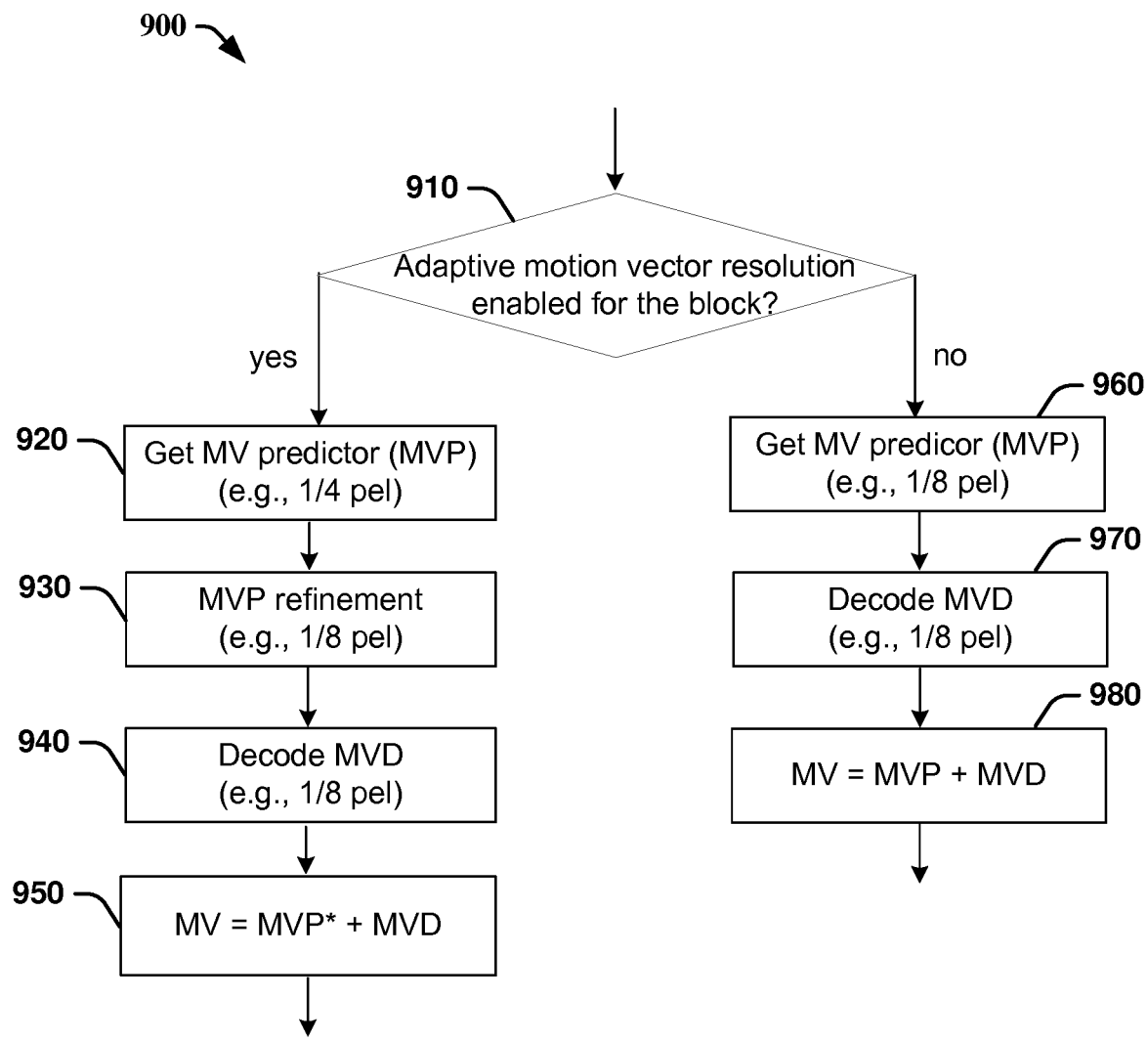
FIG. 9 illustrates an exemplary method for performing motion vector predictor refinement at a decoder, according to an embodiment of the present principles.

FIG. 9 illustrates an exemplary method 900 for performing motion vector predictor refinement at a decoder, according to an embodiment of the present principles. In this example, we suppose a decoder can refine a motion vector predictor resolution from ¼-pel to ⅛-pel.

For a block, the decoder checks (910) whether adaptive motion vector resolution is enabled, for example, using a flag in the bitstream, or using the existing methods as described above. If adaptive motion vector resolution is enabled, the decoder generates MV predictor (MVP) at ¼-pel resolution (920). The initial motion vector predictor can be generated, for example, but not limited to, using the AMVP mode of HEVC, using an average of neighboring motion vectors, or using a rounded version of a motion vector predictor. The motion vector predictor can then be refined to ⅛-pel resolution (930), for example, using the embodiments described above. The decoder decodes MVD at ⅛-pel resolution (940). The motion vector can be then obtained (950) as MV=MVP*+MVD and be used for motion-compensated prediction.

If adaptive motion vector resolution is not enabled, the decoder obtains MVP and MVD at a motion resolution that is used for the decoded motion vector, and no motion refinement is performed at the decoder. As shown in FIG. 9, the decoder may get (960, 970) both MVP and MVD at ⅛-pel resolution, and decode (980) the motion vector at ⅛-pel resolution as MV=MVP+MVD. In a variation, the decoder may get (960, 970) both MVP and MVD at ¼-pel resolution, and decode (980) the motion vector at ¼-pel resolution as MV=MVP+MVD.

Figure 10:
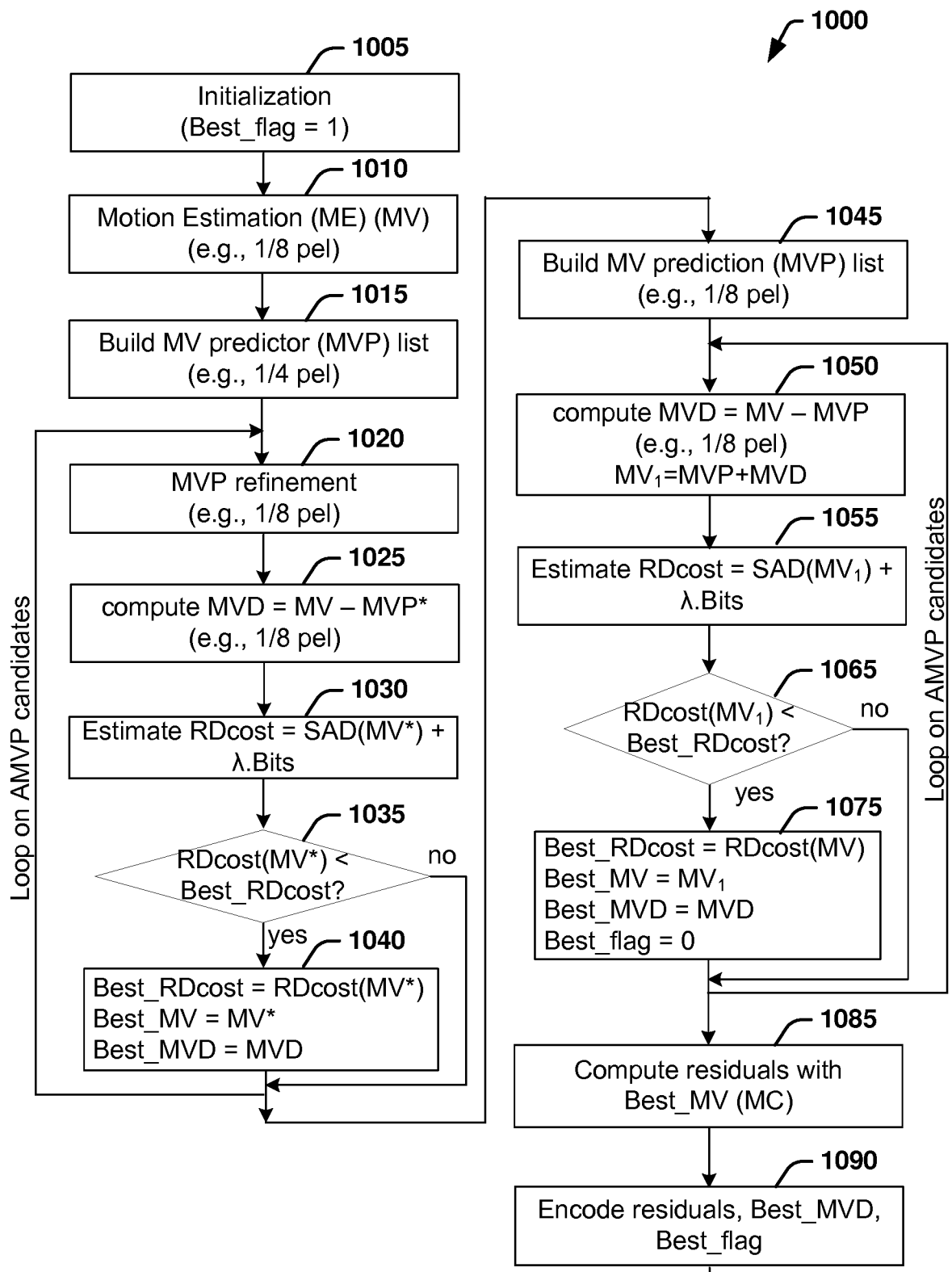
FIG. 10 illustrates an exemplary method for performing motion vector predictor refinement at an encoder, according to an embodiment of the present principles.

FIG. 10 illustrates an exemplary method 1000 for performing motion vector predictor refinement at an encoder, according to an embodiment of the present principles. The output of method 1000 may be used as an input bitstream to method 900. At the initialization step (1005), the encoder may access a video sequence to be encoded as input. Additionally, the encoder may set the parameters to initial values, for example, set Best_flag=1, and set Best_RDcost to a large value.

Motion estimation (1010) is performed in the ⅛ resolution to obtain a motion vector MV. The encoder then checks whether it is more efficient to encode the motion vector using adaptive motion refinement or not. From steps 1020-1040, the encoder checks the MV encoding cost with motion refinement, for example, using the RD (Rate-Distortion) cost. From steps 1045-1075, the encoder checks the MV encoding cost without motion refinement. Then motion compensation is performed based on the final MV (Best_MV) and the residuals can be calculated (1085). The residuals, the final MVD (Best_MVD) and the adaptive motion refinement flag (Best_flag) are encoded (1090) into the bitstream.

More particularly, at step 1015, a motion vector predictor list is built at the ¼-pel resolution, for example, using the motion vector predictor candidate list from AMVP, an rounded version (for example, to the closet integer at the desired resolution) of an initial motion vector predictor or an average of neighboring motion vectors, consistent with how a corresponding decoder builds the motion vector predictor list. The MVP list may contain only one MVP in some cases. At step 1015, the motion vector predictor list can also be built at the ⅛-pel resolution. However, one advantage of using a lower resolution (¼-pel) is that it may avoid drift in flat areas, where the RD optimization cannot differentiate between MV at the ⅛-pel or ¼-pel resolution. Using a reduced resolution allows a sort of smoothing of the MV predictor which may reduce the MV noise. Also, if the size of the search window for the refinement is relatively small (±¼ for ⅛ refinement), the precision of the starting/center MV for the search window may change the result.

For each MVP in the MVP list, MVP refinement is performed (1020), for example, as described above for the decoder. The MVD is calculated based on the refined MVP (MVP*) (1025), and the adjusted motion vector (MV*) that can be used for motion compensation (MV*=MVD+MVP*) can also be calculated. The encoding cost of the adjusted motion vector (MV*) can be estimated using RD cost at step 1030. At step 1035, the encoder checks whether the current adjusted motion vector has a smaller RD cost than the current Best_RDcost. If yes, parameters Best_RDcost, Best_MV and Best_MVD are set (1040) to the current RD cost, current adjusted motion vector, and current MVD, and Best_flag remains true (1).

At step 1045, a motion vector predictor list is built at the ⅛-pel resolution, for example, using the motion vector predictor candidate list from AMVP. For each MVP in the MVP list, the MVD is calculated (1050) based on the MVP at the ⅛-pel resolution. The encoding cost of the motion vector (MV) can be estimated using RD cost at step 1055. At step 1065, the encoder checks whether the current motion vector has a smaller RD cost than the current Best_RDcost. If yes, parameters Best_RDcost, Best_MV and Best_MVD are set (1075) to the current RD cost, current motion vector, and current MVD, and the adaptive motion refinement flag (Best_flag) is set to false (0).

In method 1000, the encoder decides whether to use adaptive motion refinement based on the encoding cost and signals the choice through a flag in the bitstream. In other embodiments, the encoder may decide whether to use adaptive motion refinement based on the video characteristics without checking the encoding cost, for example, as described further below or in Lakshman and Chen. Consequently, the encoder may only need to perform part of method 1000 (for example, the part with motion refinement, or the part without motion refinement).

By refining the motion vector predictor, the MV predictor can be more accurate. Accordingly, the MVD may statistically have lower values, and the coding cost can then be reduced. For example, as shown in TABLE 2, a motion vector (MV) for a current block from the motion estimation (1010) is 3.625, a motion vector predictor list (1015) includes {3.0, . . . }. For the motion vector predictor $MVP_0$=3.0, it is refined (1020) by motion refinement to MVP*=3.5. Subsequently, the motion vector difference is MVD=MV−MVP*=0.125. Comparing with the motion vector difference without using motion refinement MV−$MVP_0$=0.625, the MVD to be encoded is smaller and may need fewer bits to be encoded. In this example, using motion refinement may improve the compression efficiency, and thus, the encoder is likely to choose to enable adaptive motion refinement. The motion vector used for motion compensation is MVP*+MVD=3.625.

TABLE 2

|  | Resolution | Example |
| --- | --- | --- |
| MV from ME | ⅛ | 3.625 |
| MVP list (left, upper) | ¼ | {3.0 . . .} |
| MVP | ¼ | 3.0 |
| MVP-refined (MVP*) | ⅛ | 3.5 |
| MVD | ⅛ | 0.125 |
| MV for MC | ⅛ | 3.625 |

When MVD is 0, for example, when the merge mode is used, steps 1025 and 1050 are not needed, and at step 1040 and 1075, Best_MVD does not need to be calculated, and at step 1090, Best_MVD does not need to be encoded. Note that when MVD is 0, method 1000 may become the same as method 800. The motion refinement can be applied to all motion vectors corresponding to the motion vector predictors, or can be applied to a subset. For example, motion refinement is used for AMVP motion vector predictors only, or to the merge mode only.

Automatic Motion Refinement Activation

In the above embodiments, we describe that a flag (for example, Best_flag as shown in FIG. 8 or FIG. 10) can be used to indicate whether adaptive motion vector resolution is enabled. In the following, we describe various embodiments that automatically activate or deactivate motion vector resolution refinement. Thus, the encoder can indicate whether adaptive motion vector resolution is enabled without an explicit flag, and the decoder can also decide whether adaptive motion vector resolution without referring to an explicit flag.

In one embodiment, we propose to automatically activate the adaptive motion refinement based on one or more of the following criteria:

Motion similarity: The motion of the current block is similar to the motion of surrounding blocks, such that an encoder or decoder can use motion vectors of surrounding blocks for motion refinement.

Textureness (or texture level): The current block and surrounding blocks contain some texture which may allow a robust sub-pixel motion refinement.

Motion vector difference (MVD): MVD is available at both the encoder and decoder, and can be used to determine whether to use automatic adaptive motion refinement or to explicitly signal the adaptive motion refinement.

The motion similarity criterion may be measured using one or more of the following conditions:

1) $MVP_{left}$ and $MVP_{above}$ (optionally $MVP_{above-left}$) exist, namely, a motion field exists around the current block. More generally, there are one or more neighboring blocks that have motion vectors.
2) $|MVP_{left}-MVP_{current}|<T2$, $|MVP_{above}-MVP_{current}|<T2$, and $|MVP_{leftabove}-MVP_{current}|<T2$. This condition can also be a different logical combination of these three sub-conditions: $|MVP_{left}-MVP_{current}|<T2$, $|MVP_{above}-MVP_{current}|<T2$, and $|MVP_{leftabove}-MVP_{current}|<T2$. That is, the motion vectors of the surrounding blocks are similar and motion field around the current block is somewhat uniform. Here we use the same T2 to check the difference between $MVP_{left}$ and $MVP_{current}$, between $MVP_{above}$ and $MVP_{current}$, and between $MVP_{leftabove}$ and $MVP_{current}$. It should be noted that different thresholds can be used for these differences.

The textureness criterion may be measured using one or more of the following conditions:

1) Texture(L)>T3, where L is the neighboring area used for performing motion refinement, for example, 670 as shown in FIG. 6A, and texture(X) is a measure of texturing, for example, the variance in luminance of X. That is, the neighboring area has some texture.
2) Err(mc(L, MVP, Iref), L)<Err(mc(L, MVP+MVr, Iref), L)+T4, where MVP is the selected motion vector predictor that corresponds to MVD signaled in the bitstream, such that both the encoder and decoder can use the same MVP for checking this condition, Err(X, Y) is a measure of error between a group of pixels X and a group of pixels Y, for example, SAD, HAD or SSE, mc(X, v, I) is the motion compensation of the group of pixels X using the motion vector v in the reference image I, Iref is the reference image associated with the motion vector predictor MVP, T4 is a threshold on error similarity, MVP+MVr is the motion vector predictor after refinement. The MVP may be at a lower motion resolution as described before, for example, being integer rounded.

The automatic motion refinement activation may be based on all conditions under both motion similarity or textureness criteria, or may also use a subset of the conditions. Whether to signal the motion refinement activation or deactivation can be based on the motion vector difference (MVD). When $|MVD|\leq T1$, wherein MVD is the motion vector difference indicated in the bitstream and T1 is a motion threshold, in a typical example, $T1=\sqrt{2}/2$, we may choose to activate motion vector refinement without explicit signalling. That is, when the motion vector difference is small and the current motion vector is close to the current motion vector predictor, the encoder and decoder could automatically activate motion refinement. In addition, both the encoder and decoder have access to MVD, and can use MVD to determine the motion refinement activation in the same manner in order to synchronize the encoder and decoder. On the other hand, when |MVD| becomes large, the encoder and decoder may automatically deactivate motion refinement, without explicit signalling.

In another example, when a temporal candidate is used to build the motion vector predictor list, that is, when $MVP_{left}$ and $MVP_{above}$ do not co-exist or are the same, conditions 1) and 2) in the motion similarity criterion are not used. The encoder may choose whether or not to use the temporal candidate for automatic refinement.

Figure 11:
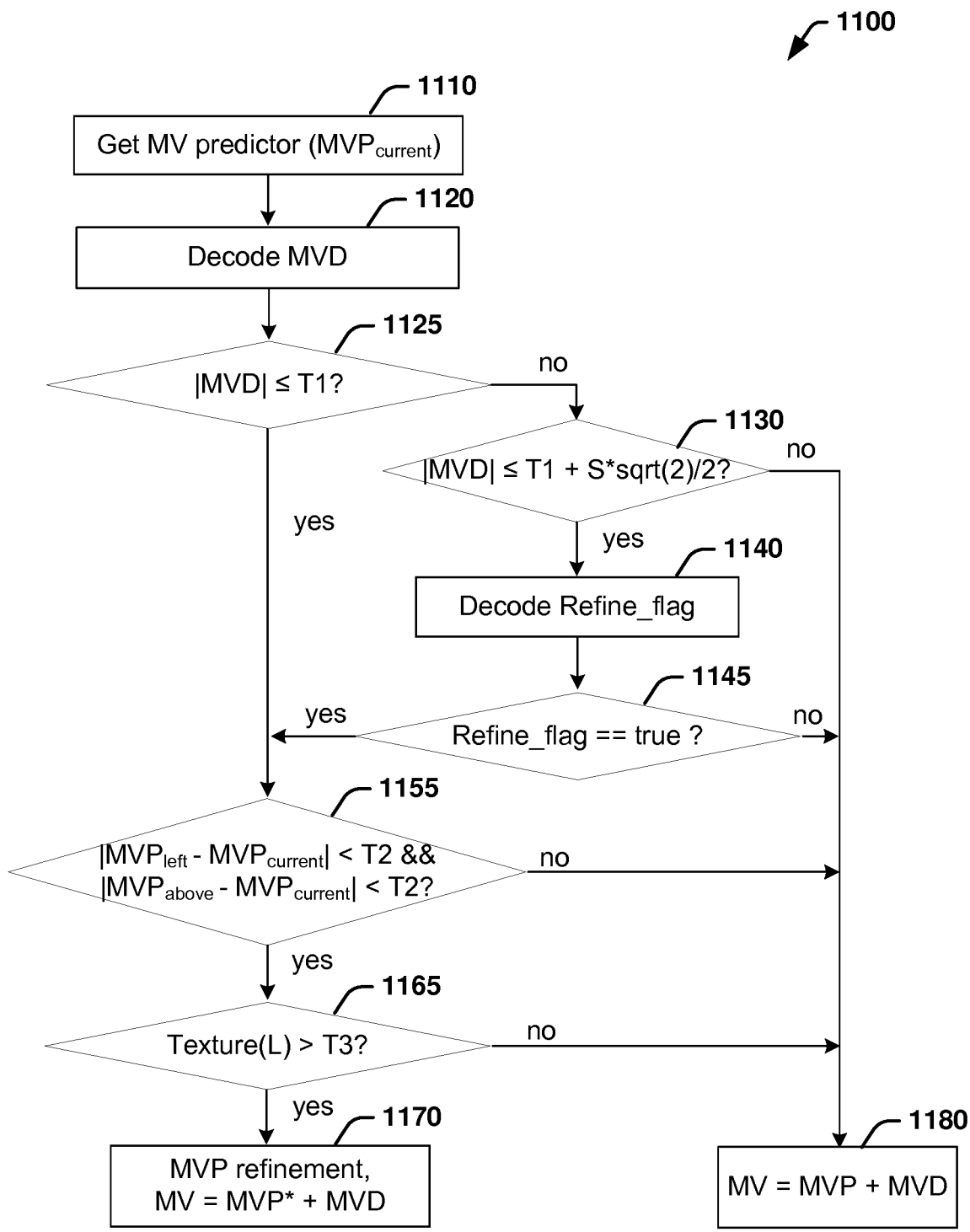
FIG. 11 illustrates an exemplary method for performing motion vector predictor refinement with automatic motion refinement activation at a decoder, according to an embodiment of the present principles.

FIG. 11 illustrates an exemplary method 1100 for performing motion vector predictor refinement with automatic motion refinement activation or deactivation at a decoder, according to an embodiment of the present principles.

For a block to be decoded, the decoder generates (1110) MV predictor ($MVP_{current}$) and decodes (1120) the MV difference (MVD). When $|MVD|\leq T1$ (1125) is true, the decoder checks other conditions to see whether motion refinement is to be activated. Otherwise, if $|MVD|>T1$, the decoder checks whether $|MVD|\leq T1+S*\sqrt{2}/2$. In one example, S=½, indicating that the motion search for the refinement is in [−½, ½]. If $|MVD|\leq T1+S*\sqrt{2}/2$ (1130), the decoder decides whether motion refinement is used based on a flag decoded (1140) from the bitstream. Otherwise, if $|MVD|>T1+S*\sqrt{2}/2$, the decoder does not perform motion refinement (i.e., the motion refinement is automatically deactivated) and decodes (1180) the motion vector based on the MVP and MVD, i.e., MV=MVP+MVD.

More particularly, the decoder checks (1155) whether $|MVP_{left}-MVP_{current}|<T2$ and $|MVP_{above}-MVP_{current}|<T2$. If yes, the decoder checks (1165) whether Texture(L)>T3. If both conditions at 1155 and 1165 are satisfied, the decoder performs motion vector predictor refinement, for example, using the various embodiments described above, and decodes (1170) the motion vector based on the refined motion vector predictor (MVP*) and MVD, i.e., MV=MVP*+MVD. Here, the motion refinement is automatically activated without a flag.

When $T1<|MVD|\leq T1+S*\sqrt{2}/2$, the decoder decodes (1140) a flag (for example, Refine_flag) indicating whether motion refinement may be used. If the flag is true (1145), the decoder continues to step 1155. Otherwise, if the flag is false (1145), the motion vector is obtained (1180) based on the MVP and MVD.

In FIG. 11, the decoder automatically deactivates or activates motion refinement in some conditions, and relies on a flag to deactivate or activate motion refinement in other conditions. The same conditions are used by a corresponding encoder to ensure the synchronization between the encoder and decoder.

When MVD is 0, for example, when the merge mode is used, the condition at step 1125 is always true and can be removed, and steps 1120, 1130, 1140, 1145 and 1180 are not needed. Alternatively, in the merge mode, motion refinement can be disabled in order to avoid adding noise on the merge deduced motion vector predictor.

Different from what is shown in FIG. 11, method 1100 can also skip steps 1130-1145. That is, when |MVD|>T1, the decoder performs step 1180 without motion refinement. Other variations can also be implemented, for example, but not limited to, skipping step 1155 and/or step 1165, checking one of the two conditions at step 1155.

Figure 12:
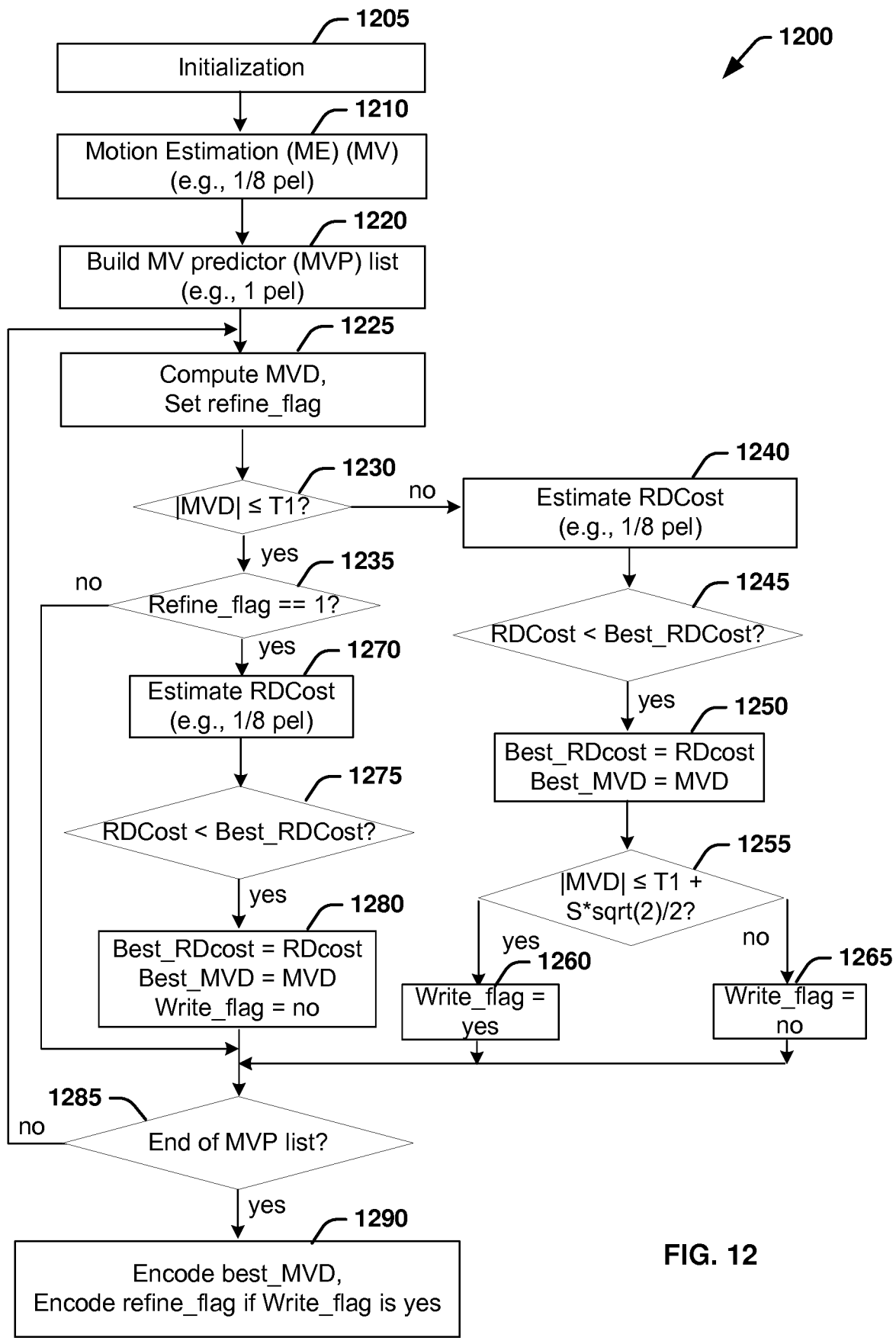
FIG. 12 illustrates an exemplary method for performing motion vector predictor refinement with automatic motion refinement activation at an encoder, according to an embodiment of the present principles.

FIG. 12 illustrates an exemplary method 1200 for performing automatic motion refinement at an encoder, according to an embodiment of the present principles. The output of method 1200 may be used as an input bitstream to method 1100. At the initialization step (1205), the encoder may access a video sequence to be encoded as input. Additionally, the encoder may set the parameters to initial values, for example, set Best_RDcost to a large value.

Motion estimation (1210) is performed at the ⅛-pel resolution to obtain a motion vector MV. At step 1220, a motion vector predictor list is built, for example, using the motion vector predictor candidate list from AMVP. A rounded version (for example, to the closet integer at the desired resolution) of an initial motion vector predictor or an average of neighboring motion vectors may be used, consistent with how a corresponding decoder builds the motion vector predictor list. The MVP list may contain only one MVP in some cases. At step 1220, the motion vector predictor list can also be built at other resolutions.

At step 1225, for a particular MVP, the encoder then checks whether it is more efficient to encode the motion vector using adaptive motion refinement or not and sets a Refine_flag to 0 or 1. When motion refinement is more efficient, Refine_flag is set to 1, and otherwise to 0. A corresponding MVD is also computed at step 1225.

Figure 13:
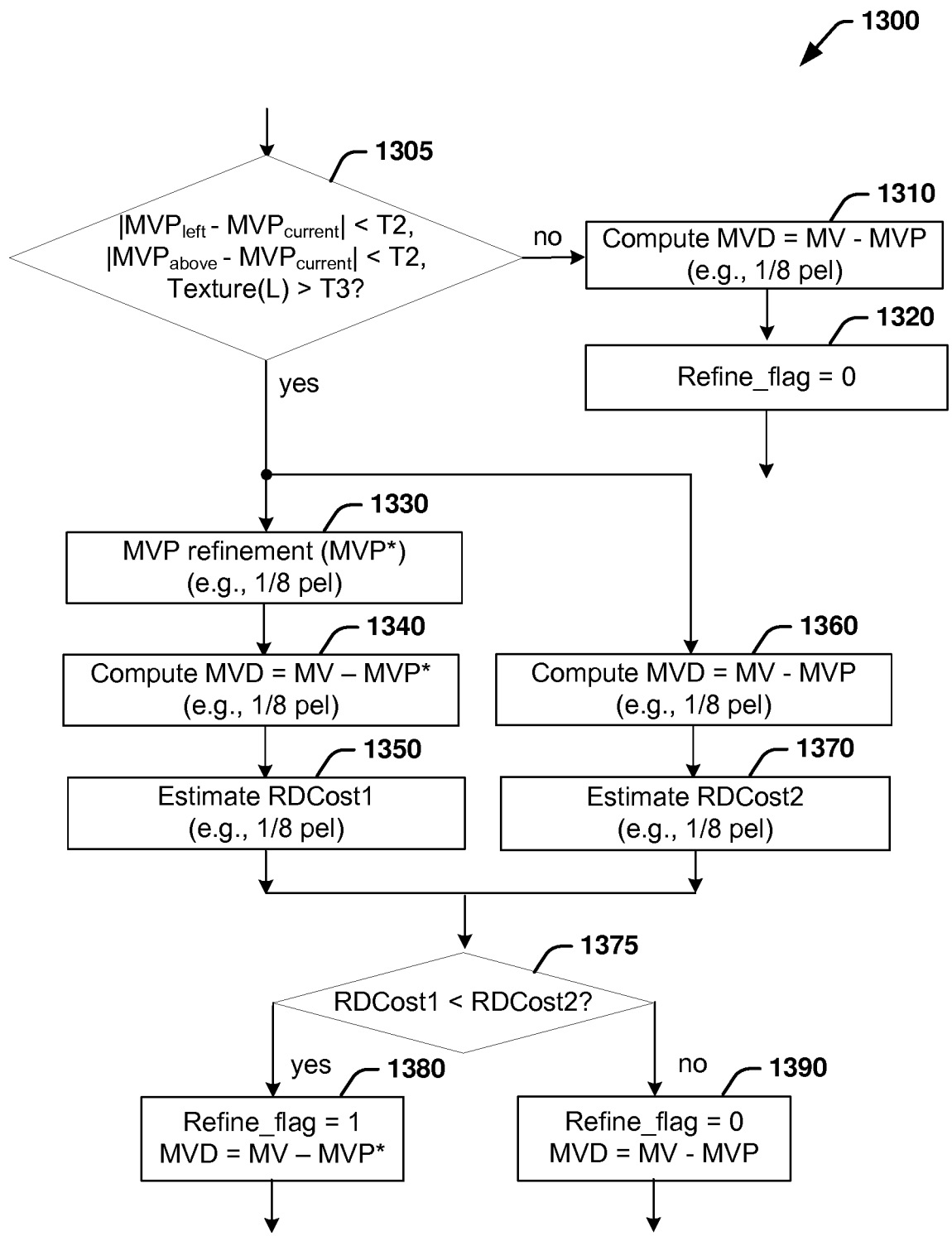
FIG. 13 illustrates an exemplary method for determining whether or not to use adaptive motion refinement for a particular MVP, according to an embodiment of the present principles.

FIG. 13 illustrates an exemplary method 1300 for determining whether or not to use adaptive motion refinement for a particular MVP, according to an embodiment of the present principles. Method 1300 can be used to implement step 1225 of method 1200.

Particularly, the encoder checks (1305) whether $|MVP_{left}-MVP_{current}|<T2$, $|MVP_{above}-MVP_{current}|<T2$, and Texture(L)>T3. If the conditions at 1305 are satisfied, the encoder performs motion vector predictor refinement (1330), for example, using the various embodiments described above, and computes (1340) the motion vector difference based on the refined motion vector predictor (MVP*), i.e., MVD=MV−MVP*. A RD Cost (RDCost1) is estimated (1350) when motion refinement is used. The encoder also computes (1360) the motion vector difference without the refined motion vector predictor, i.e., MVD=MV−MVP. A RD Cost (RDCost2) is estimated (1370) when motion refinement is not used. The RD costs with and without motion refinement are compared (1375). If RDCost1 is smaller, then Refine_flag is set (1380) to 1, and MVD is set to MV−MVP*. Otherwise, Refine_flag is set (1390) to 0, and MVD is set to MV−MVP.

If the conditions at 1305 are not satisfied, the motion vector difference is computed (1310) based on the motion vector predictor (MVP), i.e., MVD=MV−MVP, and Refine_flag is set (1320) to 0.

After the MVD and Refine_flag are determined at step 1225, at step 1230, the encoder checks whether |MVD|≤T1. If yes, the encoder further checks (1235) whether Refine_flag is equal to 1. If Refine_flag is set to 1, the encoder estimates (1270) the RD cost. If the RD cost is smaller than the current Best_RDCost (1275), parameters Best_RDcost and Best_MVD are set (1280) to the current RD cost and current MVD, and Write_flag is set to no, indicating that no explicit signaling is used to indicate adaptive motion refinement. That is, if the current MVP is selected for encoding, the motion refinement would be automatically activated without the need to send a flag.

When |MVD|>T1 (1230), the encoder estimates (1240) the RD cost. If the RD cost is smaller than the Best_RDCost (1245), parameters Best_RDcost and Best_MVD are set (1250) to the current RD cost and current MVD. The encoder then checks (1255) whether $|MVD|≤T1+S*\sqrt{2}/2$. If yes, Write_flag is set to yes. Here, if a motion vector predictor corresponding to conditional branch 1260 is selected, whether motion refinement is activated would be explicitly signaled based on Refine_flag.

Otherwise if the condition at 1255 is not satisfied, Write_flag is set (1265) to no. That is, if a motion vector predictor corresponding to conditional branch 1265 is selected, the motion refinement would be automatically deactivated without the need to send a flag.

The encoder checks (1285) whether the end of the MVP list is reached. If yes, the encoder encodes the Best_MVD, the index of the selected MVP, and corresponding residual if any. If Write_flag is set to yes, the Refine_flag is also encoded. Otherwise, if the condition at 1285 is not satisfied, the control is returned to step 1225. If the merge mode is selected, Best_MVD does not need to be encoded at step 1290. Corresponding to method 1100, method 1200 can also be varied from what is shown in FIG. 12, for example, steps 1240-1260 can be skipped.

In the above, automatic activation of deactivation of motion refinement is discussed with respect to a motion vector predictor. It should be noted that the automatic activation or deactivation can be applied to other types of motion information, for example, but not limited to, the motion vector that already includes the motion vector difference.

Various numeric values are used in the present application, for example, to determine the motion similarity or textureness based on thresholds. It should be noted that the specific values are for exemplary purposes and the present principles are not limited to these specific values.

In the above, various embodiments are described with respect to the HEVC standard. For example, various motion refinement or automatic activation methods as described above can be used to modify the motion estimation module (175) of the HEVC encoder as shown in FIG. 1 or the motion compensation module (375) of the HEVC decoder as shown in FIG. 3. However, the present principles are not limited to HEVC, and can be applied to other standards, recommendations, and extensions thereof.

In the above, we discuss motion refinement from from ¼-pel to ⅛-pel. It should be noted that the present principles can be applied to refinement between other motion resolutions, for example, but not limited to, from integer-pel to ¼-pel, from ¼-pel to ⅙-pel.

Figure 14:
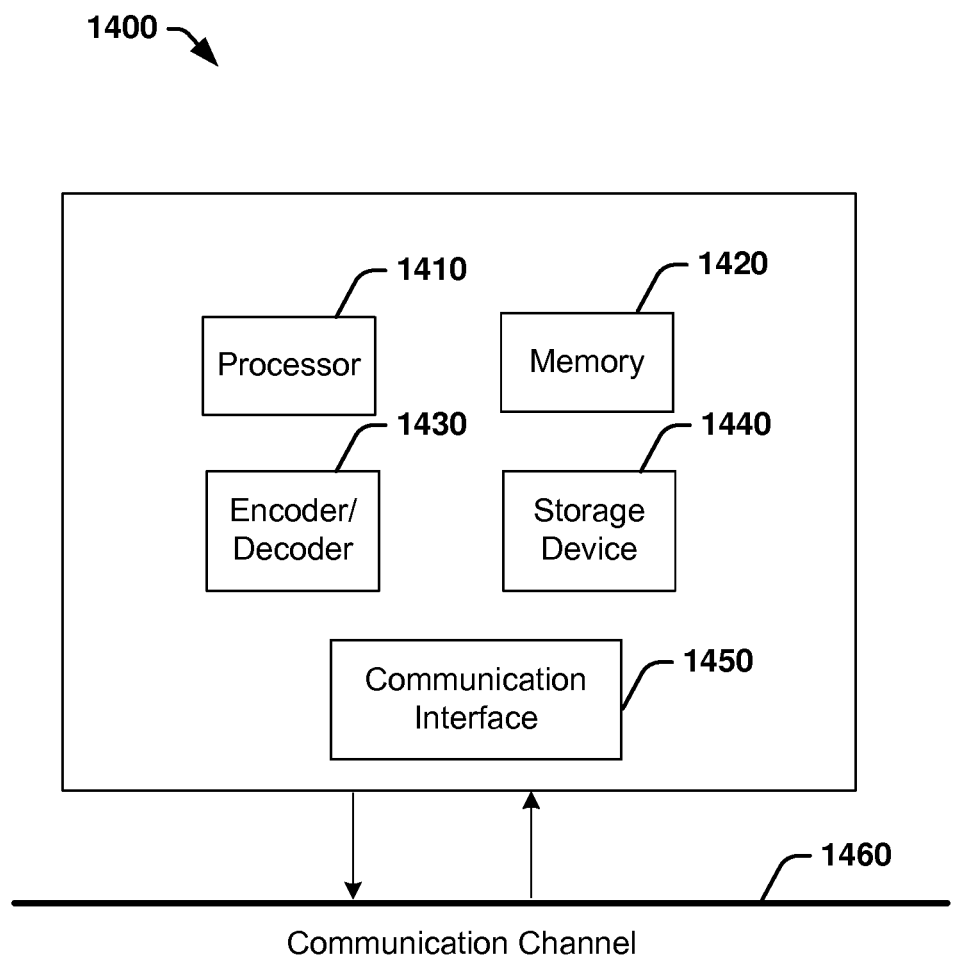
FIG. 14 illustrates a block diagram of an exemplary system in which various aspects of the exemplary embodiments of the present principles may be implemented.

FIG. 14 illustrates a block diagram of an exemplary system in which various aspects of the exemplary embodiments of the present principles may be implemented. System 1400 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1400 may be communicatively coupled to other similar systems, and to a display via a communication channel as shown in FIG. 14 and as known by those skilled in the art to implement the exemplary video system described above.

The system 1400 may include at least one processor 1410 configured to execute instructions loaded therein for implementing the various processes as discussed above. Processor 1410 may include embedded memory, input output interface and various other circuitries as known in the art. The system 1400 may also include at least one memory 1420 (e.g., a volatile memory device, a non-volatile memory device). System 1400 may additionally include a storage device 1440, which may include non-volatile memory, including, but not limited to, EEPROM, ROM, PROM, RAM, DRAM, SRAM, flash, magnetic disk drive, and/or optical disk drive. The storage device 1440 may comprise an internal storage device, an attached storage device and/or a network accessible storage device, as non-limiting examples. System 1400 may also include an encoder/decoder module 1430 configured to process data to provide an encoded video or decoded video.

Encoder/decoder module 1430 represents the module(s) that may be included in a device to perform the encoding and/or decoding functions. As is known, a device may include one or both of the encoding and decoding modules. Additionally, encoder/decoder module 1430 may be implemented as a separate element of system 1400 or may be incorporated within processors 1410 as a combination of hardware and software as known to those skilled in the art.

Program code to be loaded onto processors 1410 to perform the various processes described hereinabove may be stored in storage device 1340 and subsequently loaded onto memory 1420 for execution by processors 1410. In accordance with the exemplary embodiments of the present principles, one or more of the processor(s) 1410, memory 1420, storage device 1440 and encoder/decoder module 1430 may store one or more of the various items during the performance of the processes discussed herein above, including, but not limited to the input video, the bitstream, equations, formula, matrices, variables, operations, and operational logic.

The system 1400 may also include communication interface 1450 that enables communication with other devices via communication channel 1460. The communication interface 1450 may include, but is not limited to a transceiver configured to transmit and receive data from communication channel 1460. The communication interface may include, but is not limited to, a modem or network card and the communication channel may be implemented within a wired and/or wireless medium. The various components of system 1400 may be connected or communicatively coupled together using various suitable connections, including, but not limited to internal buses, wires, and printed circuit boards.

The exemplary embodiments according to the present principles may be carried out by computer software implemented by the processor 1410 or by hardware, or by a combination of hardware and software. As a non-limiting example, the exemplary embodiments according to the present principles may be implemented by one or more integrated circuits. The memory 1420 may be of any type appropriate to the technical environment and may be implemented using any appropriate data storage technology, such as optical memory devices, magnetic memory devices, semiconductor-based memory devices, fixed memory and removable memory, as non-limiting examples. The processor 1410 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding at a decoder, comprising:
decoding a motion vector difference for a block to be decoded in a video from a bitstream;
obtaining a motion vector predictor for said block to be decoded based on previously decoded blocks;
obtaining a motion vector for said block to be decoded as a sum of said motion vector predictor and said decoded motion vector difference;
determining whether said obtained motion vector is to be refined at said decoder;
responsive to that said obtained motion vector is to be refined, performing motion search, at said decoder, at one or more positions around a position indicated by said obtained motion vector in a reference picture to obtain a refined motion vector for said block, wherein motion refinement from said obtained motion vector to said refined motion vector is not explicitly signaled in said bitstream;
performing motion compensation for said block, based on said refined motion vector, to form a prediction block for said block; and
decoding said block based on said prediction block.

2. The method of claim 1, wherein said refined motion vector is determined based on one of (1) discontinuity between a prediction for said block and a decoded block adjacent to said block; and (2) gradients at one of said prediction and said decoded block.

3. The method of claim 1, wherein said motion vector is associated with a first motion resolution and said refined motion vector is associated with a second motion resolution, said second motion resolution being higher than said first motion resolution, further comprising:
determining said motion vector predictor at said second resolution; and
converting said motion vector predictor to a resolution lower than said first resolution, wherein said motion vector is based on said converted motion vector predictor and said motion vector difference.

4. The method of claim 3, wherein said converting comprising rounding said motion vector predictor.

5. The method of claim 1, wherein said motion vector predictor is based on an average of at least two motion vectors of decoded blocks adjacent to said block.

6. The method of claim 1, wherein said motion vector is associated with a first motion resolution and said refined motion vector is associated with a second motion resolution, said second motion resolution being higher than said first motion resolution, wherein said one or more positions are determined based on said first resolution and said second resolution.

7. A method for video encoding, comprising:
performing motion estimation to obtain a first motion vector;
obtaining a motion vector predictor list for said block to be encoded based on previously reconstructed blocks;
selecting a motion vector predictor from said motion vector predictor list;
obtaining a motion vector difference as a difference between said first motion vector and said selected motion vector predictor;
encoding said motion vector difference into a bitstream;
determining whether said first motion vector is to be refined;
responsive to that said first motion vector is to be refined, performing motion search at one or more positions around a position indicated by a second motion vector in a reference picture to obtain a refined motion vector for said block, wherein motion refinement from said second motion vector to said refined motion vector is not to be explicitly transmitted in said bitstream, and wherein said second motion vector is based on said motion vector predictor and said motion vector difference;
performing motion compensation for said block based on said refined motion vector, to form a prediction block for said block; and
encoding said block based on said prediction block.

8. The method of claim 7, wherein said motion search is performed corresponding to each predictor in said motion vector predictor list, to form a plurality of refined motion vectors, and one of said plurality of refined motion vectors is selected for encoding said block.

9. The method of claim 7, wherein said refined motion vector is determined based on one of (1) discontinuity between a prediction for said block and a reconstructed block adjacent to said block; and (2) gradients at one of said prediction and said reconstructed block.

10. The method of claim 7, wherein said first motion vector is associated with a first motion resolution and said refined motion vector is associated with a second motion resolution, said second motion resolution being higher than said first motion resolution, further comprising:
determining said motion vector predictor at said second resolution; and
converting said motion vector predictor to a resolution lower than said first resolution, wherein said second motion vector is based on said converted motion vector predictor and said motion vector difference.

11. The method of claim 10, wherein said converting comprising rounding said motion vector predictor.

12. The method of claim 7, wherein said motion vector predictor is based on an average of at least two motion vectors of reconstructed blocks adjacent to said block.

13. The method of claim 7, wherein said first motion vector is associated with a first motion resolution and said refined motion vector is associated with a second motion resolution, said second motion resolution being higher than said first motion resolution, wherein said one or more positions are determined based on said first resolution and said second resolution.

14. A video decoder apparatus comprising:
one or more processors, said one or more processors configured to:
decode a motion vector difference for a block to be decoded in a video from a bitstream;
obtain a motion vector predictor for said block to be decoded based on previously decoded blocks;
obtain a motion vector for said block to be decoded, as a sum of said motion vector predictor and said decoded motion vector difference;
determine whether said obtained motion vector is to be refined at said decoder;
responsive to that said obtained motion vector is to be refined, perform motion search, at said decoder, at one or more positions around a position indicated by said obtained motion vector in a reference picture to obtain a refined motion vector for said block, wherein motion refinement from said obtained motion vector to said refined motion vector is not explicitly signaled in said bitstream;

perform motion compensation for the block based on said refined motion vector, to form a prediction block for said block; and decode said block based on said prediction block.

15. The apparatus of claim 14, wherein said refined motion vector is determined based on one of (1) discontinuity between a prediction for said block and a decoded block adjacent to said block; and (2) gradients at one of said prediction and said decoded block.

16. The apparatus of claim 14, wherein said motion vector is associated with a first motion resolution and said refined motion vector is associated with a second motion resolution, said second motion resolution being higher than said first motion resolution, and wherein said one or more processors are further configured to:

determine said motion vector predictor at said second resolution; and convert said motion vector predictor to a resolution lower than said first resolution, wherein said motion vector is based on said converted motion vector predictor and said motion vector difference.

17. An apparatus comprising:

one or more processors, said one or more processors configured to:

perform motion estimation to obtain a first motion vector;

obtain a motion vector predictor list for said block to be encoded based on previously decoded blocks;

select a motion vector predictor from said motion vector predictor list;

obtain a motion vector difference as a difference between said first motion vector and said selected motion vector predictor;

encode said motion vector difference into a bitstream;

determine whether said first motion vector is to be refined;

responsive to that said first motion vector is to be refined, performing motion search at one or more positions around a position indicated by a second motion vector in a reference picture to obtain a refined motion vector for said block, wherein motion refinement from said second motion vector to said refined motion vector is not to be explicitly transmitted in said bitstream, and wherein said second motion vector is based on said motion vector predictor and said motion vector difference;

perform motion compensation for said block based on said refined motion vector, to form a prediction block for said block; and encode said block based on said prediction block.

18. The apparatus of claim 17, wherein said motion search is performed corresponding to each predictor in said motion vector predictor list, to form a plurality of refined motion vectors, and one of said plurality of refined motion vectors is selected for encoding said block.

19. The apparatus of claim 17, wherein said one or more processors are configured to determine said refined motion vector based on one of (1) discontinuity between a prediction for said block and a reconstructed block adjacent to said block; and (2) gradients at one of said prediction and said reconstructed block.

20. The apparatus of claim 17, wherein said motion vector is associated with a first motion resolution and said refined motion vector is associated with a second motion resolution, said second motion resolution being higher than said first motion resolution, wherein said one or more processors are further configured to:

determine said motion vector predictor at said second resolution; and convert said motion vector predictor to a resolution lower than said first resolution, wherein said first motion vector is based on said converted motion vector predictor and said motion vector difference.

* * * * *